(12) United States Patent
Decasper et al.

(10) Patent No.: US 8,370,420 B1
(45) Date of Patent: *Feb. 5, 2013

(54) WEB-INTEGRATED DISPLAY OF LOCALLY STORED CONTENT OBJECTS

(75) Inventors: Dan S. Decasper, San Mateo, CA (US); Zubin Dittia, San Francisco, CA (US); Prashanth Mundkur, Menlo Park, CA (US); Rajib Ghosh, Redwood City, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1037 days.

This patent is subject to a terminal disclaimer.

(21) Appl. No.: 10/194,623

(22) Filed: Jul. 11, 2002

(51) Int. Cl.
*G06F 15/16* (2006.01)

(52) U.S. Cl. ......... 709/202; 709/239; 709/246; 715/208

(58) Field of Classification Search .................. 709/202, 709/245, 246, 203, 250, 239, 217, 219; 715/511, 715/513, 749; 717/115
See application file for complete search history.

(56) References Cited

U.S. PATENT DOCUMENTS

| | | | |
|---|---|---|---|
| 5,220,501 A | 6/1993 | Lawlor et al. | |
| 5,307,456 A | 4/1994 | MacKay | |
| 5,572,643 A * | 11/1996 | Judson | 709/218 |
| 5,666,501 A | 9/1997 | Jones et al. | |
| 5,754,939 A | 5/1998 | Herz et al. | |
| 5,761,662 A | 6/1998 | Dasan | |
| 5,768,528 A | 6/1998 | Stumm | |
| 5,862,325 A * | 1/1999 | Reed et al. | 709/201 |
| 5,870,559 A | 2/1999 | Leshem et al. | |
| 5,905,492 A * | 5/1999 | Straub et al. | 715/744 |
| 5,913,033 A * | 6/1999 | Grout | 709/219 |
| 5,920,701 A | 7/1999 | Miller et al. | |
| 5,923,736 A | 7/1999 | Shachar | |
| 5,958,008 A | 9/1999 | Pogrebisky et al. | |
| 5,974,572 A | 10/1999 | Weinberg et al. | |
| 5,987,476 A * | 11/1999 | Imai et al. | 1/1 |
| 5,999,179 A | 12/1999 | Kekic et al. | |
| 6,011,537 A | 1/2000 | Slotznick | |
| 6,022,315 A | 2/2000 | Iliff | |
| 6,029,175 A * | 2/2000 | Chow et al. | 707/104.1 |
| 6,038,601 A | 3/2000 | Lambert et al. | |
| 6,052,730 A | 4/2000 | Felciano et al. | |
| 6,076,109 A | 6/2000 | Kikinis | |
| 6,081,840 A | 6/2000 | Zhao | |
| 6,088,717 A | 7/2000 | Reed et al. | |
| 6,108,703 A * | 8/2000 | Leighton et al. | 709/226 |
| 6,125,387 A | 9/2000 | Simonoff et al. | |
| 6,138,141 A | 10/2000 | DeSimone et al. | |

(Continued)

FOREIGN PATENT DOCUMENTS

WO WO-2006/074072 7/2006

OTHER PUBLICATIONS

Eric M. Schurman et al., Dynamic HTML in Action Web Technology, Second Edition, Microsoft Press, 1999, pp. 5-6,82,85-89.*

(Continued)

*Primary Examiner* — John Follansbee
*Assistant Examiner* — Madhu Woolcock
(74) *Attorney, Agent, or Firm* — Foley and Lardner LLP; Christopher J. McKenna

(57) ABSTRACT

A method and apparatus for displaying locally stored content objects is disclosed. In one embodiment, the method comprises running an agent on a machine and integrating one or more locally stored objects in a page being displayed using information from the agent.

18 Claims, 19 Drawing Sheets

U.S. PATENT DOCUMENTS

| | | | |
|---|---|---|---|
| 6,144,962 A | 11/2000 | Weinberg et al. | |
| 6,145,003 A | 11/2000 | Sanu et al. | |
| 6,163,779 A * | 12/2000 | Mantha et al. | 715/234 |
| 6,166,729 A | 12/2000 | Acosta et al. | |
| 6,181,736 B1 | 1/2001 | McLaughlin et al. | |
| 6,182,129 B1 * | 1/2001 | Rowe et al. | 709/221 |
| 6,185,625 B1 * | 2/2001 | Tso et al. | 709/247 |
| 6,199,082 B1 * | 3/2001 | Ferrel et al. | 715/522 |
| 6,206,829 B1 | 3/2001 | Iliff | |
| 6,230,205 B1 | 5/2001 | Garrity et al. | |
| 6,237,006 B1 | 5/2001 | Weinberg et al. | |
| 6,263,201 B1 * | 7/2001 | Hashimoto et al. | 455/403 |
| 6,272,537 B1 | 8/2001 | Kekic et al. | |
| 6,282,711 B1 | 8/2001 | Halpern et al. | |
| 6,285,985 B1 | 9/2001 | Horstmann | |
| 6,286,029 B1 * | 9/2001 | Delph | 709/203 |
| 6,292,835 B1 | 9/2001 | Huang et al. | |
| 6,295,551 B1 | 9/2001 | Roberts et al. | |
| 6,308,273 B1 | 10/2001 | Goertzel et al. | |
| 6,314,451 B1 * | 11/2001 | Landsman et al. | 709/203 |
| 6,317,761 B1 | 11/2001 | Landsman et al. | |
| 6,340,977 B1 | 1/2002 | Lui et al. | |
| 6,341,310 B1 | 1/2002 | Leshem et al. | |
| 6,345,288 B1 | 2/2002 | Reed et al. | |
| 6,366,907 B1 | 4/2002 | Fanning et al. | |
| 6,366,933 B1 | 4/2002 | Ball et al. | |
| 6,389,462 B1 * | 5/2002 | Cohen et al. | 709/218 |
| 6,389,469 B1 | 5/2002 | Vekslar et al. | |
| 6,405,192 B1 * | 6/2002 | Brown et al. | 707/3 |
| 6,449,627 B1 | 9/2002 | Baer et al. | |
| 6,470,383 B1 | 10/2002 | Leshem et al. | |
| 6,473,794 B1 | 10/2002 | Guheen et al. | |
| 6,482,156 B2 | 11/2002 | Iliff | |
| 6,490,587 B2 | 12/2002 | Easty et al. | |
| 6,492,995 B1 * | 12/2002 | Atkin et al. | 715/703 |
| 6,507,854 B1 * | 1/2003 | Dunsmoir et al. | 715/501.1 |
| 6,519,571 B1 | 2/2003 | Guheen et al. | |
| 6,523,027 B1 | 2/2003 | Underwood | |
| 6,536,037 B1 | 3/2003 | Barrese et al. | |
| 6,549,944 B1 | 4/2003 | Weinberg et al. | |
| 6,553,129 B1 | 4/2003 | Rhoads | |
| 6,553,376 B1 * | 4/2003 | Lewis et al. | 707/10 |
| 6,560,639 B1 | 5/2003 | Dan et al. | |
| 6,567,918 B1 * | 5/2003 | Flynn et al. | 726/7 |
| 6,573,907 B1 | 6/2003 | Madrane | |
| 6,578,078 B1 * | 6/2003 | Smith et al. | 709/224 |
| 6,587,928 B1 * | 7/2003 | Periyannan et al. | 711/138 |
| 6,594,692 B1 * | 7/2003 | Reisman | 709/219 |
| 6,606,744 B1 | 8/2003 | Mikurak | |
| 6,611,840 B1 | 8/2003 | Baer et al. | |
| 6,611,862 B2 * | 8/2003 | Reisman | 709/217 |
| 6,615,166 B1 | 9/2003 | Guheen et al. | |
| 6,615,235 B1 * | 9/2003 | Copeland et al. | 709/203 |
| 6,622,168 B1 | 9/2003 | Datta | |
| 6,633,742 B1 * | 10/2003 | Turner et al. | 434/350 |
| 6,643,657 B1 | 11/2003 | Baird et al. | |
| 6,658,000 B1 | 12/2003 | Raciborski et al. | |
| 6,658,464 B2 * | 12/2003 | Reisman | 709/219 |
| 6,664,978 B1 | 12/2003 | Kekic et al. | |
| 6,671,818 B1 | 12/2003 | Mikurak | |
| 6,678,864 B1 | 1/2004 | Tsai | |
| 6,687,745 B1 * | 2/2004 | Franco et al. | 709/219 |
| 6,697,824 B1 | 2/2004 | Bowman-Amuah | |
| 6,714,536 B1 | 3/2004 | Dowling | |
| 6,721,713 B1 | 4/2004 | Guheen et al. | |
| 6,728,000 B1 | 4/2004 | Lapstun et al. | |
| 6,735,497 B2 | 5/2004 | Wallace et al. | |
| 6,735,691 B1 | 5/2004 | Capps et al. | |
| 6,747,970 B1 | 6/2004 | Lamb et al. | |
| 6,757,710 B2 | 6/2004 | Reed | |
| 6,766,944 B2 | 7/2004 | Silverbrook et al. | |
| 6,766,945 B2 | 7/2004 | Kia et al. | |
| 6,772,214 B1 * | 8/2004 | McClain et al. | 709/229 |
| 6,785,784 B1 * | 8/2004 | Jing et al. | 711/154 |
| 6,788,315 B1 | 9/2004 | Kekic et al. | |
| 6,789,731 B2 | 9/2004 | Kia et al. | |
| 6,792,615 B1 | 9/2004 | Rowe et al. | |
| 6,813,039 B1 | 11/2004 | Silverbrook et al. | |
| 6,816,872 B1 | 11/2004 | Squibb | |
| 6,825,945 B1 | 11/2004 | Silverbrook et al. | |
| 6,825,956 B2 | 11/2004 | Silverbrook et al. | |
| 6,832,717 B1 | 12/2004 | Silverbrook et al. | |
| 6,836,806 B1 * | 12/2004 | Raciborski et al. | 709/245 |
| 6,839,701 B1 | 1/2005 | Baer et al. | |
| 6,843,420 B2 | 1/2005 | Paul et al. | |
| 6,848,000 B1 * | 1/2005 | Reynolds | 709/226 |
| 6,849,045 B2 | 2/2005 | Iliff | |
| 6,862,105 B2 | 3/2005 | Silverbrook et al. | |
| 6,865,736 B2 * | 3/2005 | Holmberg et al. | 717/158 |
| 6,880,123 B1 | 4/2005 | Landsman et al. | |
| 6,901,595 B2 | 5/2005 | Mukundan et al. | |
| 6,904,449 B1 | 6/2005 | Quinones | |
| 6,907,451 B1 | 6/2005 | Mukundan et al. | |
| 6,917,971 B1 | 7/2005 | Klein | |
| 6,918,113 B2 | 7/2005 | Patel et al. | |
| 6,934,376 B1 | 8/2005 | McLaughlin et al. | |
| 6,938,212 B2 * | 8/2005 | Nakamura | 715/748 |
| 6,947,440 B2 * | 9/2005 | Chatterjee et al. | 370/429 |
| 6,957,186 B1 | 10/2005 | Guheen et al. | |
| 6,959,320 B2 | 10/2005 | Shah et al. | |
| 6,959,377 B2 * | 10/2005 | Gold et al. | 712/216 |
| 6,963,981 B1 | 11/2005 | Bailey et al. | |
| 6,965,912 B2 | 11/2005 | Friedman et al. | |
| 6,972,864 B2 | 12/2005 | Lapstun et al. | |
| 6,976,090 B2 | 12/2005 | Ben-Shaul et al. | |
| 6,980,318 B1 | 12/2005 | Silverbrook et al. | |
| 6,980,962 B1 | 12/2005 | Arganbright et al. | |
| 6,983,878 B2 | 1/2006 | Silverbrook et al. | |
| 6,986,102 B1 | 1/2006 | Baer et al. | |
| 6,987,506 B1 | 1/2006 | Lapstun et al. | |
| 6,988,126 B2 | 1/2006 | Wilcock et al. | |
| 6,993,591 B1 * | 1/2006 | Klemm | 709/232 |
| 6,996,274 B2 | 2/2006 | Lapstun et al. | |
| 6,996,605 B2 | 2/2006 | Low et al. | |
| 7,000,019 B2 | 2/2006 | Low et al. | |
| 7,003,731 B1 * | 2/2006 | Rhoads et al. | 715/768 |
| 7,006,881 B1 | 2/2006 | Hoffberg et al. | |
| 7,006,893 B2 | 2/2006 | Hart et al. | |
| 7,007,034 B1 | 2/2006 | Hartman, Jr. et al. | |
| 7,009,738 B2 | 3/2006 | Silverbrook et al. | |
| 7,010,578 B1 * | 3/2006 | Lewin et al. | 709/217 |
| 7,012,710 B2 | 3/2006 | Lapstun et al. | |
| 7,013,290 B2 | 3/2006 | Ananian et al. | |
| 7,017,823 B2 | 3/2006 | Lapstun et al. | |
| 7,025,276 B2 | 4/2006 | Lapstun et al. | |
| 7,028,025 B2 * | 4/2006 | Collins | 1/1 |
| 7,031,010 B2 | 4/2006 | Lapstun et al. | |
| 7,034,691 B1 | 4/2006 | Rapaport et al. | |
| 7,035,907 B1 * | 4/2006 | Decasper et al. | 709/212 |
| 7,038,797 B1 | 5/2006 | Lapstun et al. | |
| 7,043,488 B1 | 5/2006 | Baer et al. | |
| 7,043,524 B2 | 5/2006 | Shah et al. | |
| 7,047,212 B1 | 5/2006 | Pych et al. | |
| 7,047,485 B1 * | 5/2006 | Klein et al. | 715/513 |
| 7,047,498 B2 | 5/2006 | Lui et al. | |
| 7,054,901 B2 * | 5/2006 | Shafer | 709/203 |
| 7,055,169 B2 | 5/2006 | Delpuch et al. | |
| 7,055,739 B1 | 6/2006 | Lapstun et al. | |
| 7,057,608 B2 | 6/2006 | Paul et al. | |
| 7,058,720 B1 * | 6/2006 | Majidimehr | 709/231 |
| 7,064,681 B2 | 6/2006 | Horstemeyer | |
| 7,068,382 B1 | 6/2006 | Silverbrook et al. | |
| 7,070,098 B1 | 7/2006 | Lapstun et al. | |
| 7,076,494 B1 | 7/2006 | Baer et al. | |
| 7,077,333 B2 | 7/2006 | Silverbrook et al. | |
| 7,079,712 B1 | 7/2006 | Silverbrook et al. | |
| 7,080,780 B2 | 7/2006 | Silverbrook et al. | |
| 7,085,755 B2 | 8/2006 | Bluhm et al. | |
| 7,085,764 B2 * | 8/2006 | Bangel et al. | 707/10 |
| 7,089,239 B1 | 8/2006 | Baer et al. | |
| 7,089,487 B2 | 8/2006 | Tsai | |
| 7,096,418 B1 | 8/2006 | Singhal et al. | |
| 7,103,673 B2 * | 9/2006 | Kumagai et al. | 709/233 |
| 7,107,619 B2 | 9/2006 | Silverman | |
| 7,113,110 B2 | 9/2006 | Horstemeyer | |
| 7,119,716 B2 | 10/2006 | Horstemeyer | |
| 7,123,239 B1 | 10/2006 | Lapstun et al. | |

| | | |
|---|---|---|
| 7,124,101 B1 | 10/2006 | Mikurak |
| 7,130,807 B1 | 10/2006 | Mikurak |
| 7,134,598 B2 | 11/2006 | Silverbrook et al. |
| 7,134,601 B2 | 11/2006 | Silverbrook et al. |
| 7,146,617 B2 | 12/2006 | Mukundan et al. |
| 7,149,698 B2 | 12/2006 | Guheen et al. |
| 7,150,017 B1 * | 12/2006 | Vogl et al. .................. 718/102 |
| 7,150,396 B2 | 12/2006 | Silverbrook et al. |
| 7,154,638 B1 | 12/2006 | Lapstun et al. |
| 7,155,243 B2 | 12/2006 | Baldwin et al. |
| 7,159,014 B2 * | 1/2007 | Kausik et al. ................ 709/217 |
| 7,162,088 B2 | 1/2007 | Lapstun et al. |
| 7,165,041 B1 | 1/2007 | Guheen et al. |
| 7,167,270 B2 | 1/2007 | Silverbrook et al. |
| 7,173,722 B1 | 2/2007 | Lapstun et al. |
| 7,174,056 B2 | 2/2007 | Silverbrook et al. |
| 7,175,079 B1 | 2/2007 | Silverbrook et al. |
| 7,177,949 B2 * | 2/2007 | Bracewell et al. ........... 709/246 |
| 7,181,696 B2 | 2/2007 | Brock |
| 7,203,948 B2 | 4/2007 | Mukundan et al. |
| 7,222,098 B2 | 5/2007 | Silverbrook et al. |
| 7,222,780 B2 | 5/2007 | Lapstun et al. |
| 7,225,244 B2 | 5/2007 | Reynolds et al. |
| 7,234,107 B1 * | 6/2007 | Aoki et al. .................... 715/513 |
| 7,269,664 B2 | 9/2007 | Hutsch et al. |
| 7,430,598 B2 | 9/2008 | Raden et al. |
| 7,609,689 B1 * | 10/2009 | Desanti et al. ............... 370/389 |
| 7,653,744 B2 * | 1/2010 | Kanefsky et al. ............ 709/245 |
| 2001/0044809 A1 * | 11/2001 | Parasnis et al. .............. 707/513 |
| 2002/0023141 A1 * | 2/2002 | Yen et al. ..................... 709/217 |
| 2002/0033844 A1 * | 3/2002 | Levy et al. .................... 345/744 |
| 2002/0035619 A1 * | 3/2002 | Dougherty et al. .......... 709/219 |
| 2002/0038388 A1 * | 3/2002 | Netter ........................... 709/318 |
| 2002/0055966 A1 * | 5/2002 | Border et al. ................ 709/200 |
| 2002/0069223 A1 * | 6/2002 | Goodisman et al. ......... 707/513 |
| 2002/0078087 A1 * | 6/2002 | Stone ............................ 707/511 |
| 2002/0083093 A1 * | 6/2002 | Goodisman et al. ......... 707/511 |
| 2002/0083183 A1 | 6/2002 | Pujare et al. |
| 2002/0087883 A1 | 7/2002 | Wohlgemuth et al. |
| 2002/0091763 A1 | 7/2002 | Shah et al. |
| 2002/0099738 A1 | 7/2002 | Grant |
| 2002/0124055 A1 * | 9/2002 | Reisman ....................... 709/218 |
| 2002/0129164 A1 * | 9/2002 | Van Der Meulen et al. .. 709/239 |
| 2002/0138225 A1 * | 9/2002 | Ramaley et al. ............. 709/226 |
| 2002/0138841 A1 * | 9/2002 | Ward ............................ 725/78 |
| 2002/0147805 A1 | 10/2002 | Leshem et al. |
| 2002/0161908 A1 | 10/2002 | Benitez et al. |
| 2003/0004882 A1 | 1/2003 | Holler et al. |
| 2003/0005116 A1 * | 1/2003 | Chase et al. .................. 709/225 |
| 2003/0009538 A1 | 1/2003 | Shah et al. |
| 2003/0014368 A1 | 1/2003 | Leurig et al. |
| 2003/0014442 A1 * | 1/2003 | Shiigi et al. .................. 707/513 |
| 2003/0046577 A1 | 3/2003 | Silverman |
| 2003/0069803 A1 | 4/2003 | Pollitt |
| 2003/0163478 A1 * | 8/2003 | Kirkland ...................... 707/102 |
| 2003/0191812 A1 | 10/2003 | Agarwalla et al. |
| 2003/0206554 A1 * | 11/2003 | Dillon .......................... 370/432 |
| 2003/0217126 A1 | 11/2003 | Polcha et al. |
| 2004/0002903 A1 | 1/2004 | Stolfo et al. |
| 2004/0031058 A1 | 2/2004 | Reisman |
| 2004/0073630 A1 * | 4/2004 | Copeland et al. ............ 709/218 |
| 2004/0255048 A1 | 12/2004 | Lev Ran et al. |
| 2005/0220086 A1 | 10/2005 | Dowling |
| 2005/0273514 A1 * | 12/2005 | Milkey et al. ................ 709/232 |
| 2006/0008256 A1 | 1/2006 | Khedouri et al. |
| 2006/0069926 A1 | 3/2006 | Ginter et al. |
| 2006/0075463 A1 | 4/2006 | Braddy et al. |
| 2006/0130124 A1 | 6/2006 | Richardson et al. |
| 2006/0190455 A1 | 8/2006 | Braddy et al. |
| 2006/0256130 A1 | 11/2006 | Gonzalez |
| 2007/0179955 A1 | 8/2007 | Croft et al. |
| 2007/0245409 A1 | 10/2007 | Harris et al. |
| 2008/0212945 A1 | 9/2008 | Khedouri et al. |

OTHER PUBLICATIONS

Non Final Office Action. USPTO, U.S. Appl. No. 09/566,068, filed Jul. 30, 2003. pp. 3-15.

Final Office Action. USPTO, U.S. Appl. No. 09/566,068, filed May 19, 2004. pp. 2-15.

Non Final Office Action. USPTO, U.S. Appl. No. 10/028,398, Jun. 3, 2004. pp. 2-3.

Final Office Action. USPTO, U.S. Appl. No. 10/028,398, filed Nov. 26, 2004. pp. 2-4.

Non Final Office Action. USPTO, U.S. Appl. No. 10/028,398, filed May 27, 2005. pp. 3-5.

Neuman et al., The Kerberos Network Authentication Service (V5), Internet draft, work in progress, Sep. 2004.

Non Final Office Action, USPTO, U.S. Appl. No. 09/566,068. Jul. 30, 2003.

Non Final Office Action, USPTO, U.S. Appl. No. 09/660,991, Aug. 15, 2003.

Final Office Action, USPTO, U.S. Appl. No. 09/660,991, Apr. 2, 2004.

Final Office Action, USPTO, U.S. Appl. No. 09/566,068, May 19, 2004.

Non Final Office Action, USPTO, U.S. Appl. No. 10/028,398, Jun. 3, 2004.

Final Office Action, USPTO, U.S. Appl. No. 10/028,398, Nov. 26, 2004.

Non Final Office Action, USPTO, U.S. Appl. No. 09/660,991, Feb. 23, 2005.

Non Final Office Action, USPTO, U.S. Appl. No. 10/028,398, May 27, 2005.

Final Office Action, USPTO, U.S. Appl. No. 09/660,991, Jan. 5, 2006.

Final Office Action, USPTO, U.S. Appl. No. 09/660,991, Oct. 20, 2006.

Non Final Office Action. USPTO, U.S. Appl. No. 09/566,068. Jul. 30, 2003.

Non Final Office Action. USPTO, U.S. Appl. No. 09/660,991. Aug. 15, 2003.

Final Office Action. USPTO, U.S. Appl. No. 09/660,991. Apr. 2, 2004.

Final Office Action. USPTO, U.S. Appl. No. 09/566,068. May 19, 2004.

Non Final Office Action. USPTO, U.S. Appl. No. 10/028,398. Jun. 3, 2004.

Final Office Action. USPTO, U.S. Appl. No. 10/028,398. Nov. 26, 2004.

Non Final Office Action. USPTO, U.S. Appl. No. 09/660,991. Feb. 23, 2005.

Non Final Office Action. USPTO, U.S. Appl. No. 10/028,398. May 27, 2005.

Final Office Action. USPTO, U.S. Appl. No. 09/660,991. Jan. 5, 2006.

Final Office Action. USPTO, U.S. Appl. No. 09/660,991. Oct. 20, 2006.

* cited by examiner

```
                                     blueangels_emb[1]
<!DOCTYPE HTML PUBLIC "-//W3C//DTD HTML 4.01 Transitional//EN">
<HTML>
<HEAD>
<TITLE>Jibe Networks Inc.</TITLE>
<LINK REL="stylesheet" HREF="/stylesheets/main.css">
<LINK REL=stylesheet TITLE=std HREF="/stylesheets/jibestyle.css" TYPE="text/css">
<BASE TARGET="_top">
<SCRIPT language=JavaScript src="/js/partners_menu_array.js"
type=text/javascript></SCRIPT>
<SCRIPT language=JavaScript src="/js/mmenu.js" type=text/javascript></SCRIPT>
<SCRIPT LANGUAGE="JavaScript">
function goFull() {
        if ( navigator.appName == "Netscape" ) {
                window.player.document.player.SetDisplaySize(3);
        } else {
                window.player.AllowChangeDisplaySize = true;
                window.player.DisplaySize = 3;
        }
}
<!-- Begin RollOver
image1 = new Image(); image1.src = "/graphx/fullscreen.on.gif";
// End -->
</script>
</HEAD>
    <BODY LEFTMARGIN="0" TOPMARGIN="0" MARGINWIDTH="0" MARGINHEIGHT="0">
      <TABLE WIDTH="774" HEIGHT="100%" CELLSPACING="0" CELLPADDING="0" BORDER="1"
ALIGN="CENTER" BGCOLOR="#FFFFFF" BORDERCOLOR="#CCCCCC">
        <TR>
          <TD VALIGN="top">
            <table width="100%" border="0" cellspacing="0" cellpadding="0"
height="112">
              <tr>
                <td height="112" width="230" ALIGN="RIGHT"><a href="/"><img
src="/graphx/logo.gif" width="217" height="84" border="0"></a></td>
                <td height="112" align="RIGHT" valign="BOTTOM"> 
                  <script language="JavaScript"
src="http://localhost:26138/jibe_include.js"></script>
                  <script language="JavaScript">
                    var jibe_cached_objects;
                    var local_file;
                    if("Jibe-Is-Installed{}" == "yes") {
                        window.location.replace("/downloads/download.shtml");
```

FIG. 1B-1

```
                    }
                if (jibe_cached_objects) {
                        var obj =
jibe_cached_objects["http://jibe.tv/content/shortfilms/blueangels.avi"];
                        if (obj) {
                                local_file = obj.local_url;
                                //document.write("Blue Angels is in cache at
location " + local_file + "<BR/>");
                        } else {
                                local_file =
"http://jibe.tv/content/shortfilms/blueangels.html";
                                //document.write("Blue Angles not in cache.<BR/>");
                        }
                }
            </script>
        </td>
    </tr>
</table>
<table width="100%" border="0" cellspacing="0" cellpadding="0"
height="34" bgcolor="#E3E3E3">
    <tr>
                                blueangels_emb[1]
        <td height="0" width="200" bgcolor="#F7F7F7"
background="/graphx/menu_bar_shadow.gif"><img
src="file:///C|/cygwin/home/Bill%20Gates/httpd/html/content/graphx/dummy.gif"
width="1" height="1"></td>
        <td height="5" bgcolor="#F7F7F7"
background="/graphx/menu_bar_shadow.gif"><img
src="file:///C|/cygwin/home/Bill%20Gates/httpd/html/content/graphx/dummy.gif"
width="1" height="1"></td>
    </tr>
    <tr>
        <td height="24" width="200"> </td>
        <td height="24"> <img src="/graphx/dummy.gif" width="1" height="1">
        </td>
    </tr>
    <tr>
        <td height="5" width="200" bgcolor="#F7F7F7"
background="/graphx/menu_bar_shadow_bottom.gif"><img
src="file:///C|/cygwin/home/Bill%20Gates/httpd/html/content/graphx/dummy.gif"
height="1"></td>
```

FIG. 1B-2

```
              <td height="5" bgcolor="#F7F7F7"
background="/graphx/menu_bar_shadow_bottom.gif"><img
src="file:///C|/cygwin/home/Bill%20Gates/httpd/html/content/graphx/dummy.gif"
width="1" height="1"></td>
            </tr>
          </table>
          <TABLE WIDTH="100%" BORDER="0" CELLSPACING="0" CELLPADDING="0"
HEIGHT="103">
            <TR>
              <TD WIDTH="27"> </TD>
              <TD VALIGN="BOTTOM" width="743"><IMG
SRC="/graphx/movies/blueangels_header.gif" ALT="Welcome" BORDER="0"></TD>
            </TR>
          </TABLE>
          <TABLE WIDTH="100%" BORDER="0" CELLSPACING="0" CELLPADDING="0"
HEIGHT="100%">
            <TR>
              <TD VALIGN="TOP" CLASS="content">
                <TABLE WIDTH="100%"  BORDER="0" CELLSPACING="0" CELLPADDING="0"
HEIGHT="535">
                  <TR>
                    <TD VALIGN="TOP" HEIGHT="533" width="24">
                      <CENTER>
                        <BR />
                      </CENTER>
                    </TD>
                    <TD VALIGN="TOP" HEIGHT="533" width="722">
                      <DIV ALIGN="right">
                        <A HREF="#"  onClick="goFull()"
onMouseOver="if(document.images) document.butlup0.src='/graphx/fullscreen.on.gif';"
onMouseOut="if(document.images)
document.butlup0.src='/graphx/fullscreen.off.gif';"><IMG NAME="butlup0"
SRC="/graphx/fullscreen.off.gif" BORDER="0"></A>
                      </DIV>
                        <script language="javascript">
                          document.write(" \
                        <OBJECT\
                          CLASSID=\"CLSID:22d6f312-b0f6-11d0-94ab-0080c74c7e95\"
\
CODEBASE=\"http://activex.microsoft.com/activex/controls/mplayer/en/nsmp2inf.cab#Ver
sion=6,4,5,715\"\
                        STANDBY=\"Loading Microsoft Windows Media Player
components...\"\
```

FIG. 1B-3

```
                    blueangels_emb[1]
                TYPE=\"application/x-oleobject\"\
                WIDTH=\"720\" HEIGHT=\"480\" ID=\"player\">\
            <PARAM NAME=\"FileName\" VALUE=\"" + local file + "\">\
            <PARAM NAME=\"AnimationatStart\" VALUE=\"false\">\
            <PARAM NAME=\"TransparentatStart\" VALUE=\"true\">\
            <PARAM NAME=\"AutoStart\" VALUE=\"true\">\
            <PARAM NAME=\"ShowControls\" VALUE=\"1\">\
            <PARAM NAME=\"ShowDisplay\" VALUE=\"0\">\
            <PARAM NAME=\"ShowStatusBar\" VALUE=\"0\">\
            <EMBED TYPE=\"application/x-mplayer2\"\
PLUGINSPAGE=\"http://www.microsoft.com/isapi/redir.dll?prd=windows&sbp=mediaplay
er&ar=Media&sba=Plugin&\"\
                SRC=\""+ local file + "\"\
                NAME=\"MediaPlayer\"\
                SHOWCONTROLS=\"1\" SHOWDISPLAY=\"1\"\
                SHOWSTATUSBAR=\"0\"\
                WIDTH=\"720\" HEIGHT=\"480\">\
            </EMBED>\
        </OBJECT>");
            </script>
        </TD>
        <TD VALIGN="TOP" HEIGHT="533" width="24"> </TD>
      </TR>
    </TABLE>
    <P> </P>
   </TD>
  </TR>
 </TABLE>
</TD>
</TR>
<TR>
  <TD HEIGHT="10" CLASS="credits" ALIGN="center">
    <A HREF="/index.shtml" TARGET="_top">Home</A>
    | <A HREF="/html/jiberspace.shtml" TARGET="_top">Jiberspace</A>
    | <A HREF="/html/faq.shtml" TARGET="_top">FAQs</A>
    | <A HREF="/html/technology.shtml" TARGET="_top">Technology</A>
    | <A HREF="/downloads/download.shtml" TARGET="_top">Downloads</A>
    | <A HREF="/html/c_info.shtml" TARGET="_top">Company Info</A>
    | <A HREF="/html/contact.shtml" TARGET="_top">Contact</A>
    | <A HREF="/html/jobs.shtml" TARGET="_top">Jobs</A>
    | <A HREF="/html/News.shtml" TARGET="_top">News</A>
```

FIG. 1B-4

```
        </TD>
       </TR>
     </TABLE>
    </BODY>
  </HTML>
```

FIG. 1B-5

```
var jibe_copyright="Jibe Agent v1.1 (c) 2002 Jibe Networks, Inc. All rights reserved. - Please var jibe_is_installed = true;
var jibe_version = "1.1";
var jibe_cache_size = 5922357248;
var jibe_cache_used = 376950455;

var jibe_cached_objects = {

"http://jibe.tv/tef/html/content/trailer.mov": {
                provider: "jibe",
                content_type: "video/quicktime",
                content_length: 8601572,
                cached_bytes: 8601572,
                status: "completed",
                local_url: "file:///C:\\Program Files\\Jibe Networks\\jibed\\jibecache\\2817
                provider_data: {
                        "title": "Siren Trailer",
                        "embedding_url": "http://jibe.tv/tef/html/trailer_emb.shtml",
                        "duration": "00:00:49"
                }
        },
        "http://jibe.tv/tef/html/content/Siren1jibe.mov": {
                provider: "jibe",
                content_type: "video/quicktime",
                content_length: 43881675,
                cached_bytes: 43881675,
                status: "completed",
                local_url: "file:///C:\\Program Files\\Jibe Networks\\jibed\\jibecache\\1474
                provider_data: {
                        "title": "Episode One - The Break In",
                        "embedding_url": "http://jibe.tv/tef/html/episode1_emb.shtml",
                        "duration": "00:03:16"
                }
```

FIG. 1C-1

```
},
"http://jibe.tv/tef/html/content/Siren2jibe.mov": {
        provider: "jibe",
        content_type: "video/quicktime",
        content_length: 25164787,
        cached_bytes: 25164787,
        status: "completed",
        local_url: "file:///C:\\Program Files\\Jibe Networks\\jibed\\jibecache\\5623
        provider_data: {
                "title": "Episode Two - The Heist",
                "embedding_url": "http://jibe.tv/tef/html/episode2_emb.shtml",
                "duration": "00:01:56"
        }
},
"http://jibe.tv/tef/html/content/Siren3jibe.mov": {
        provider: "jibe",
        content_type: "video/quicktime",
        content_length: 32011276,
        cached_bytes: 32011276,
        status: "completed",
        local_url: "file:///C:\\Program Files\\Jibe Networks\\jibed\\jibecache\\2582
        provider_data: {
                "title": "Episode Three - The Hunt",
                "embedding_url": "http://jibe.tv/tef/html/episode3_emb.shtml",
                "duration": "00:02:19"
        }
},
"http://jibe.tv/tef/html/content/Siren4jibe.mov": {
        provider: "jibe",
        content_type: "video/quicktime",
        content_length: 25682332,
        cached_bytes: 25682332,
        status: "completed",
```

FIG. 1C-2

```
            local_url: "file:///C:\\Program Files\\Jibe Networks\\jibed\\jibecache\\3660
            provider_data: {
                    "title": "Episode Four  - The Showdown",
                    "embedding_url": "http://jibe.tv/tef/html/episode4_emb.shtml",
                    "duration": "00:01:51"
            }
    },
    "http://jibe.tv/tef/html/content/Siren5jibe.mov": {
            provider: "jibe",
            content_type: "video/quicktime",
            content_length: 26504143,
            cached_bytes: 26504143,
            status: "completed",
            local_url: "file:///C:\\Program Files\\Jibe Networks\\jibed\\jibecache\\3878
            provider_data: {
                    "title": "Episode Five  - Perchance to Dream",
                    "embedding_url": "http://jibe.tv/tef/html/episode5_emb.shtml",
                    "duration": "00:03:13"
            }
    },
    "http://jibe.tv/tef/html/content/Siren6jibe.mov": {
            provider: "jibe",
            content_type: "video/quicktime",
            content_length: 29442975,
            cached_bytes: 29442975,
            status: "completed",
            local_url: "file:///C:\\Program Files\\Jibe Networks\\jibed\\jibecache\\1135
            provider_data: {
                    "title": "Episode Six - Mr. Black and Mr. White",
                    "embedding_url": "http://jibe.tv/tef/html/episode6_emb.shtml",
                    "duration": "00:03:35"
            }
    },
    "http://jibe.tv/tef/html/content/Siren7jibe.mov": {
            provider: "jibe",
            content_type: "video/quicktime",
            content_length: 34255502,
            cache_bytes: 34255502,
            status: "completed",
            local_url: "file:///C:\\Program Files\\Jibe Networks\\jibed\\jibecache\\1874
            provider_data: {
                    "title": "Episode Seven - Betrayal in the Desert",
                    "embedding_url": "http://jibe.tv/tef/html/episode7_emb.shtml",
                    "duration": "00:02:41"
```

FIG. 1C-3

```
        }
    },
    "http://jibe.tv/tef/html/content/Siren8jibe.mov": {
        provider: "jibe",
        content_type: "video/quicktime",
        content_length: 25060769,
        cached_bytes: 25060769,
        status: "completed",
        local_url: "file:///C:\\Program Files\\Jibe Networks\\jibed\\jibecache\\4633
        provider_data: {
            "title": "Episode Eight  - A Call From Alexander Christos",
            "embedding_url": "http://jibe.tv/tef/html/episode8_emb.shtml",
            "duration": "00:02:58"
        }
    },
    "http://jibe.tv/tef/html/content/Siren9jibe.mov": {
        provider: "jibe",
        content_type: "video/quicktime",
        content_length: 14025409,
        cached_bytes: 14025409,
        status: "completed",
        local_url: "file:///C:\\Program Files\\Jibe Networks\\jibed\\jibecache\\806
        provider_data: {
            "title": "Episode Nine  - Trapped",
            "embedding_url": "http://jibe.tv/tef/html/episode9_emb.shtml",
            "duration": "00:01:39"
        }
    },
    "http://jibe.tv/tef/html/content/siren10jibe.mov": {
        provider: "jibe",
        content_type: "video/quicktime",
        content_length: 29915528,
        cached_bytes: 29915528,
        status: "completed",
        local_url: "file:///C:\\Program Files\\Jibe Networks\\jibed\\jibecache\\2774
        provider_data: {
            "title": "Episode Ten  - Escape",
            "embedding_url": "http://jibe.tv/tef/html/episode10_emb.shtml",
            "duration": "00:02:04"
        }
```

FIG. 1C-4

```
},
"http://jibe.tv/tef/html/content/Siren11jibe.mov": {
        provider: "jibe",
        content_type: "video/quicktime",
        content_length: 26762965,
        cached_bytes: 26762965,
        status: "completed",
        local_url: "file:///C:\\Program Files\\Jibe Networks\\jibed\\jibecache\\1846
        provider_data: {
                "title": "Episode Eleven - Where The Hell Is The Cavalry",
                "embedding_url": "http://jibe.tv/tef/html/episode11_emb.shtml",
                "duration": "00:01:55"
        }
},
"http://jibe.tv/tef/html/content/SirenOuttakesJibe.mov": {
        provider: "jibe",
        content_type: "video/quicktime",
        content_length: 31225266,
        cached_bytes: 31225266,
        status: "completed",
        local_url: "file:///C:\\Program Files\\Jibe Networks\\jibed\\jibecache\\1656
        provider_data: {
                "title": "Siren Outtakes",
                "embedding_url": "http://jibe.tv/tef/html/outtakes_emb.shtml",
                "duration": "00:03:35"
        }
},
"http://jibe.tv/content/shortfilms/blueangels.avi": {
        provider: "jibe",
        content_type: "video/x-msvideo",
        content_length: 24416256,
        cached_bytes: 5000000,
        status: "inprogress",
        local_url: "file:///C:\\Program Files\\Jibe Networks\\jibed\\jibecache\\1067
        provider_data: {
                "title": "Blue Angels",
                "embedding_url": "http://jibe.tv/content/shortfilms/blueangels_emb"
                "duration": "00:01:53"
```

var jibe_deleted_objects = {

};

var jibe_subscribed_chapters = {

"jibe.tv/essentials" : {
                    provider: "jibe",
            status: "active",
            cache_size: 740294656,
            cache_used: 0,
            cached_objects: [
            ],
            provider_data: {

"chapter_title": "Reserved"
            }
    },
    "jibe.tv/movietrailers" : {
            provider: "jibe",
            status: "active",
            cache_size: 1850736640,
            cache_used: 0,
            cached_objects: [
            ],
            provider_data: {

"chapter_title": "Movie Trailers"
            }
    },
    "jibe.tv/shortfilms" : {
            provider: "jibe",
            status: "active",
            cache_size: 1850736640,
            cache_used: 24416256,
            cached_objects: [
```

FIG. 1C-6

```
                    "http://jibe.tv/content/shortfilms/blueangels.avi"        ],
        provider_data: {

"chapter_title": "Short Films"
        }
},
"jibe.tv/tef" : {
        provider: "jibe",
        status: "active",
        cache_size: 1850736640,
        cache_used: 352534199,
        cached_objects: {

"http://jibe.tv/tef/html/content/trailer.mov",
                "http://jibe.tv/tef/html/content/Siren1jibe.mov",
                "http://jibe.tv/tef/html/content/Siren2jibe.mov",
                "http://jibe.tv/tef/html/content/Siren3jibe.mov",
                "http://jibe.tv/tef/html/content/Siren4jibe.mov",
                "http://jibe.tv/tef/html/content/Siren5jibe.mov",
                "http://jibe.tv/tef/html/content/Siren6jibe.mov",
                "http://jibe.tv/tef/html/content/Siren7jibe.mov",
                "http://jibe.tv/tef/html/content/Siren8jibe.mov",
                "http://jibe.tv/tef/html/content/Siren9jibe.mov",
                "http://jibe.tv/tef/html/content/Siren10jibe.mov",
                "http://jibe.tv/tef/html/content/Siren11jibe.mov",
                "http://jibe.tv/tef/html/content/SirenOuttakesJibe.mov"
        provider_data: {

"chapter_title": "Siren Episodes"
        }
}
}
var jibe_subscribed_objects = {
};
```

FIG. 1C-7

WEB-INTEGRATED DISPLAY OF LOCALLY STORED CONTENT OBJECTS

FIELD OF THE INVENTION

The present invention relates to the field of content pre-caching in a networked environment; more particularly, the present invention relates to displaying content objects in a web environment.

BACKGROUND OF THE INVENTION

The World Wide Web ("web") uses the client-server model to communicate information between clients and servers. Web servers are coupled to the Internet and respond to document requests from web clients. Web clients (e.g., web "browsers") are programs that allow a user to simply access web documents located on web servers.

An example of a client-server system interconnected through the Internet may include a remote server system interconnected through the Internet to a client system. The client system may include conventional components such as a processor, a memory (e.g., RAM), a bus which coupled the processor and memory, a mass storage device (e.g., a magnetic hard disk or an optical storage disk) coupled to the processor and memory through an I/O controller and a network interface, such as a conventional modem. The server system also may include conventional components such as a processor, memory (e.g., RAM), a bus which coupled the processor and memory, a mass storage device (e.g., a magnetic or optical disk) coupled to the processor and memory through an I/O controller and a network interface, such as a conventional modem.

To define the addresses of resources on the Internet, Uniform Resource Locator (URL) system are used. A URL is a descriptor that specifically defines a type of Internet resource and its location. To access an initial web document, the user enters the URL for a web document into a web browser program. Then, a request is made by a client system, such as a router or other network device, and is sent out over the network to a web server. Thus, the web browser sends a request to the server that has the web document using the URL. The web server responds to the request and sends the desired content back over the network to the requester. For example, the web server responds to the HyperText Transfer Protocol (HTTP) request by sending the requested object to the client. In many cases, the object is a plain text (ASCII) document containing text (in ASCII) that is written in HyperText Markup Language (HTML); however, the object may be a video clip, movie or other bandwidth intensive content.

A problem with the Internet is that it has limited bandwidth resources and different points in the Internet may experience network congestion, resulting in poor performance especially for bandwidth-intensive applications. The Internet backbone is often painfully slow. The bandwidth limitation is mainly due to one or more congested links between the web server and the client. Broadband access can help in solving the first mile problem but does not help if the congestion occurs deeper in the network. The "first-mile" is the first link from the server to the Internet. This can become a bottleneck if the content provider does not provision for sufficient bandwidth on this link or if there is a "flash-flood" of requests to the server.

High-quality on-demand video over the Internet has been promised for a long time now. Lately, the hype has increased due to the emerging deployment of broadband access technologies like digital subscriber line (DSL), cable modems, and fixed wireless. These technologies promise to bring full motion, TV quality video to consumers and businesses. Unfortunately, early adopters of the technology quickly discovered that they still cannot get video in any reasonable quality over the network. Certainly, broadband access improves the viewing experience—some web sites targeted to broadband connected customers provide movies with slightly higher resolution. However, the video remains as jerky and fuzzy as before, synchronization with the audio is poor, and it requires often tens of seconds of buffering before starting. Nobody would seriously consider this to be an alternative to DVD or analog TV.

Providing video over the Internet is difficult because video requires huge amounts of bandwidth, even by today's standards. MPEG4-compressed NTSC-quality video, for example, uses an average data rate of 1.2 Mbits/s, with peak rates as high as 3 Mbits/s. MPEG2/DVD quality video consumes 3.7 Mbits/s on the average, with peaks up to 8 Mbits/s.

Most of today's broadband Internet links, especially those to small to medium-sized businesses (SMBs) typically provide data rates in the 100s of Kbits/s up to 2 Mbits/s. Most residences get asynchronous digital subscriber line (ADSL) technology, which is typically provisioned at approximately 1 Mbits/s for downloads from the Internet, and 128 Kbits/s for uploads. Often access links are shared among multiple users, which further reduces the bandwidth available to an individual.

While these data rates are expected to gradually increase in the long term, another phenomenon causing bandwidth shortage will remain: overprovisioning. Typically, Internet Service Providers (ISPs) overprovision their broadband links for economic reasons by a factor of ten. This means that if all their customers would use the service simultaneously, every one of those customers would get only $\frac{1}{10}$th of the bandwidth they signed up for. While this scenario might sound unlikely, it is important to note that bandwidth will degrade during peak hours. The problem is better known from cable modems, where customers share a cable segment, but applies to all broadband access technologies.

The network backbone can also be the bottleneck. Especially backbone peering points are likely to impose low data rates, which slows down end-to-end network speed despite fast last mile technology. Even technology advances such as terabit routers, dense wave division multiplexing (DWDM), and faster transmission equipment will not help significantly if, as expected, Internet traffic continues to keep growing faster than these advances in technology.

One prior art solution to accommodate the slowness of the Internet backbone is to move content closer to individuals desiring the content. To that end, content may be cached on the carrier edge and requests for such content may be serviced from these caches, instead of the web server servicing the requests. Distributing content in this manner can require large numbers of cache memories being deployed at the carrier edge and each cache memory stores content from a number of sites. When a request is made for content from a site that has been stored in one (or more) of the cache memories that is closer (from a network proximity viewpoint) to the requester than the original website, the request is satisfied from the cache. In such a situation, the interactive experience for text and images is improved significantly only if content from the site has been stored in the cache and the individual making the request is close enough to one of the servers supporting such a cache to satisfy requests with the content stored therein. This is referred to as carrier edge caching. One provider of such a service is Akamai. Also, such an arrangement for caching content requires that the content owner and the entity caching the content enter an agreement with respect to the access for that content so that the content can be stored ahead of time. Some of the providers of a carrier edge caching service use dedicated links (e.g., via satellites) to feed web pages and embedded objects to these servers and circumvent the Internet backbone entirely. Providing carrier edge caching for high-resolution video requires a particularly large number of servers to be deployed, since the number of clients each server can handle simultaneously is very small.

While carrier edge caching takes the load off the backbone and has the potential to significantly improve the end user's experience for text and image-based content, there are two major shortcomings with this approach. First, it requires hardware infrastructure to be deployed on a giant scale. Without servers in all major ISP's point of presence (POPs) and satellite receivers in central offices (COs), caching on the carrier edge does not work effectively. To deploy and maintain this hardware infrastructure is very cost intensive. Second, the last mile access link remains the bottleneck for affordable truly high resolution video for the foreseeable future.

While carrier edge caching has shortcomings, there are other problems associated with providing content over the Internet. For example, when providing content over the Internet, a content provider is limited in only being able to display the content in one way and without any insight into what content is already cached at a particular client. In other words, the content provider is limited in that it does not know what client side caching is occurring. This may limit a content provider's ability to control the number and order in which those content objects are displayed as that is under the control of the browser. This is of significance when the content provider only desires to allow display of content to which an individual has subscribed.

SUMMARY OF THE INVENTION

A method and apparatus for displaying locally stored content objects is disclosed. In one embodiment, the method comprises running an agent on a machine and integrating one or more locally stored objects in a page being displayed using information from the agent.

Other features and advantages of the present invention will be apparent from the accompanying drawings and from the detailed description that follows below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 1B-1, 1B-2, 1B-3, 1B-4 are 1B-5 are exemplary web page.

FIGS. 1C-1, 1C-2, 1C-3. 1C-4. 1C-5, 1C-6 and 1C-7 are example lists of objects.

FIGS. 2, 3, 4, and 5 illustrate embodiments of a precaching architecture.

DETAILED DESCRIPTION

Figure 1A:
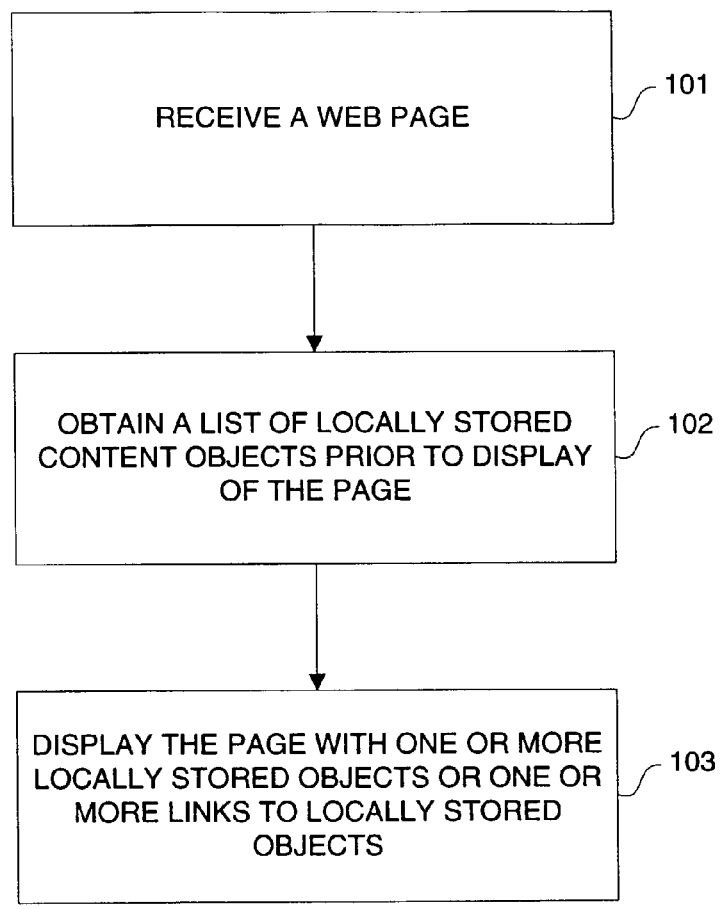
FIG. 1A illustrates a flow diagram of one embodiment of a process for controlling the display of documents.

A method and apparatus for integrating the display of locally stored content objects into web pages is described. In one embodiment, the method comprises a browser receiving a page over a network. The page includes a program (e.g., script) and one or more links to objects that are accessible over the network. The method also includes obtaining a list of one or more locally stored objects based on information in the script prior to completely displaying the web page and displaying the web page with at least one link to one of the one or more locally stored objects in place of at least one of the one or more of links in the page.

The content objects may include web pages, video files, audio files, source code, executable code, programs (e.g., games), archives of one Or more of these types of objects, databases, etc. A chapter, for purposes herein, is a set of content objects classified according to content.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc. Each may be coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

A method and apparatus for integrating the display of locally stored content objects into web pages is described. FIG. 1A is a flow diagram illustrating one embodiment of a process for manipulating content objects. The process may be performed by processing logic that may comprise hardware (e.g., circuitry, dedicated logic, etc.), software (such as is run on a general purpose computer system or a dedicated machine), or a combination of both.

Referring to FIG. 1A, the process comprises processing logic (e.g., a client, a browser) receiving a web page over a network connection (processing block 101). The page includes a program (e.g., script) and one or more links to content objects that are accessible over the network. As described in more detail below, in one embodiment, the content object may come from a content provider or another peer.

Processing logic, such as a web browser, prior to allowing the page to be displayed, obtains a list of one or more locally stored objects from a process running on the same machine as the web browser (e.g., a daemon process, called "agent") (e.g., script) (processing block 102).

Thereafter, processing logic (e.g., the web browser) displays the page with links to zero, one or more locally stored content objects (processing block 103).

In one embodiment, a web browser running on the client changes the link to a content object after determining that a client has downloaded or is in the process of downloading this content object (or one or more additional objects) or portions thereof, such that these content objects are in the cache of the client. A daemon process or agent also running on the client provides this information to the browser. For example, the agent may provide information to a program (e.g., script) in an HTML document that causes a web page to be displayed in a certain fashion (e.g., only showing content objects already in the client's cache or only those subscribed to). In another example, such information may cause the web browser to embed an object in another page to display a content object to an individual.

In one embodiment, a web browser on the client changes a web page by replacing at least one string in the page based on the information provided by an agent running locally to the client. The string may be a portion of a program (e.g., script). In one embodiment, the web page includes a program that uses the information to indicate how a content object is to be presented or stored at the client and changing the web page comprises modifying the program to change a representation of the content object. The local information upon which a change in the web page is based may be whether an individual is subscribed to one or more other objects and/or whether one or more other objects are stored in a cache of the client.

In a previous approach, middleware sat between the operating system and the browser and as the browser would browse the world wide web, web pages would go through the middleware. When the browser sought the particular page, the middleware would translate the link if a particular object being sought was in a local cache. That is, the middleware would change the web URL to specify a local URL to a file stored locally. This was performed using special strings (macros).

In the present invention, the middleware consists of an agent (daemon) no longer exists and the browser obtains information about objects stored locally, as opposed to their web location, from that agent directly. In such a case, web pages contain special text, such as html text. An example of this text is given below:

<html>
        <script language="javascript" src="URL">
        </script>
    </html>

This instructs the browser to include a javascript file into a web page. The above language specifies that there is a Javascript file at the location that is to be fetched before the rest of the web page is displayed. The browser, upon seeing the javascript, fetches a file from the location of the URL specified in the script. In one embodiment, an example of a URL may be as follows:

http://localhost:26138/provider/jibe_include.js

The file jibe_include.js is pulled in from the agent. In one embodiment, the object agent generates the file on the fly from information it has stored locally and sends it to the browser. Thus, a number of objects are stored locally and the agent conveys information about locally stored objects to the browser. In one embodiment, this is done with the following script as a second set of variables:

var jibe_cached_objects={
        {object_name, fraction_cached, local_URL}
        :
    };

These variables can include a list of the objects in the cache and can contain the state information that the agent wants to tell the browser. For example, for each cached object in the list of cached objects that are maintained by the object agent, there may be an object name specified (object_name), an amount of the object that is in the cache (fraction_cached), and local access URL (local_URL). In the web page, the locally stored version of the object may be accessed the local_URL. That is, the local_URL indicates where to get the local object from and is, in essence, a direct link to that object. Therefore, there is no need to replace any URLs in the webpage as they are coming. An example of such a case is shown in FIGS. 1B-1, 1B-2, 1B-3, 1B-4 are 1B-5.

An example list of objects is shown in FIGS. 1C-1, 1C-2, 1C-3. 1C-4. 1C-5, 1C-6 and 1C-7. The information in the example in FIGS. 1C-1, 1C-2, 1C-3. 1C-4. 1C-5, 1C-6 and 1C-7 is sent from the agent to the browser when the browser encounters this page. In one embodiment, this all occurs in one connection. That is, in one embodiment, all the information is sent to the browser in one file so it has anything it would need.

For purposes of security and authentication, a REFERER field in the HTTP header may be used. The REFERER field specifies the URL of the page that is requesting an embedded object. Such embedded objects could be images, video files, or Javascript, which are part of the page and which are loaded after the page (or more specifically the HTML for the page) is loaded. Upon receiving the request for an embedded object, the agent determines if the domain of the requesting page is authorized to obtain the data requested. For example, if the requesting page has the following URL http://www.jibefilms.com/film_directory.html, and the requesting page tries to include http://127.0.0.1/jibe.tv/jibe_include.js, the REFERER would be set to
http://www.jibefilms.com/film_directory.html
in the HTTP request for
http://127.0.0.1/jibe.tv/jibe_include.js.

The agent checks if jibefilms.com is a valid domain for the provider jibe.tv. Valid domains are specified ahead of time by the provider and may be given to the agent by a network operations center (NOC). If the agent determines the domain of the page including the object to be valid, the agent responds to the request by sending the desired object, for example a content object, or a Javascript database file. If not, the agent responds by not sending the content object or sending only a subset of the Javascript data base or no Javascript data at all. One application of this is when a web page includes the jibe_include.js Javascript file.

The remainder of the web page can access this information either directly or through special functions which are also added to the file by the agent.

For example, for an object that is to be displayed is stored locally, the browser can be controlled through a script in a web page to replace the link to the object to point to the one in local storage. Such may be accomplished using the following:

```
if (jibe_cached_objects["object_name"]
    && (jibe_cached_objects["object_name"].status
    =="completed")){
document.write("
"<a  href="+jibe_cached_objects["object_name"].lo-
    cal_URL
"> . . . .
```

Note that the script determines if the object is cached and that its status is complete indicating that the entire object is in the cache. If those conditions are met, then the web page is modified to link to the content object in memory. Thus, when the remainder of the webpage is to be displayed, the browser can include links to one or more locally stored objects. In one embodiment, such a link may be the following:

<a href="file:// . . . > Click here </a>

Portions of an exemplary web page are given below. In one embodiment, each such page includes the following line in the 'head' section of the page.
<script language="javascript"
src="http://localhost:26138/provider_name/jibe_in-
clude.js"></script>

This line provides access to javascript functions that allow a user to subscribe to chapters or individual objects. It also provides a user with the database of locally cached/deleted objects, and the list of existing chapter/object subscriptions. In one embodiment, this database only contains information relevant to an individual site. An exemplary format of this database and the functions is provided below.

The field entitled "provider_name" in the URL below is replaced with an assigned provider name, for example:
http://localhost:26138/cnn.com/jibe_include.js The following is an exemplary body of a web page that has been modified as described above. Note that the page includes text to indicate the chapters to which an individual has subscribed along with the amount of space in the cache currently occupied by objects.

```
<body>
    <h1> Sample modified Page </h1>
    <script language="javascript" src=
"http://Localhost:26138/jibe.tv/jibe_include.js"></script>
    <!--
    Example code that checks if the agent is installed and prints
        its version, the total local disk cache size (in megabytes)
        dedicated to all one's chapters, and the number of mega-
        bytes of that cache that are currently taken up by objects
        in the cache.
    -->
    <script language="javascript">
        var jibe_is_installed;
        if (jibe_is_installed) {
            document.write("object agent version"+jibe_ver-
                sion+" is installed.<br/>");
            document.write("Total cache:"+(jibe_cache_size/
                1024/1024)+"MB (used:"+(jibe_cache_used/
                1024/1024)+"MB)<br/>");
        } else {
            document.write("The object agent is NOT
                installed<bd>");
        }
    </script>
    </body>
</html>
```

An Exemplary Database File

This is an example of the javascript database file served by the agent. On a computer system that is running the agent, a version of this file contains locally relevant data is usually accessible through the following URL:
http://localhost:26138/provider_name/jibe_include.js
where provider_name is the uniquely assigned provider name assigned to each individual user. In one embodiment, this URL is included at the top of all modified web pages (preferably in the web page's <head> section) and defines several variables that contain the local cache state, subscribed chapters, etc., as well as functions to use when subscribing to chapters or objects. The following description sets forth how each variable and function may be used in such an embodiment.

First, a check is made to see if the object agent is installed. In one embodiment, this is performed by the browser, which checks the 'jibe-is-installed' variable before accessing any other variables defined in this file. For example, the following may be used in the included file (e.g., jibe_include.js) to indicate that agent is installed:
var jibe_is_installed=true The following statement may also be used to indicate the version number of the installed agent:
var jibe_version="1.1"

The following statement may set for the provider-specific user id:
var jibe_userid="95ab775"

The following statement may be used to set forth the providers' cache size (summed over all subscribed chapters), in bytes:
var jibe_cache_size=6350506218

The following statement may be used to set forth the number of bytes of the cache that are currently in use:
var jibe_cache_used=1982773

The 'jibe_cached_objects' variable is an associative array containing meta-data for objects that are currently in the user's local disk cache. In one embodiment, this array is indexed by the object name. A check to determine whether an object is in this set is by the following: "if (jibe_cached_objects[object_name]) {". In one embodiment, for each cached object, the following fields are defined: provider; status; content_length; cached_bytes; local_url; and provider_data. A subset of these may be used or additional field may be added in alternative embodiments.

provider: the name of the provider that published this object. In one embodiment, the object agent checks the HTTP Referrer field of the web page that includes this script against a list of host names for the provider (these should have been registered earlier). Only objects that have been published by that provider are included in jibe_cached_objects. In one embodiment, this comment applies also to other database elements included in this file.

status: one of the three "completed" (e.g., download has completed and the checksum over the object data has been verified), "inprogress" (i.e., download is currently in-progress), or "deleted" (i.e., the object has been deleted by the user).

content-length: the total size of the object, in bytes.

cached-bytes: the number of bytes of the object that are currently in cache. The cached_bytes and content_length fields may be used by the provider to implement a download progress meter.

local_url: the URL at which the cached copy of the file is available locally. This may be either a file:/// or a http://localhost:port/ URL. In one embodiment, if this field is absent (e.g., undefined), a default value of http://localhost:26138/object_name should be used, where object_name is the full name of the object. If the object is a packaged object, the local_url points to the local folder into which the package has been "unzipped". Individual files within the archive can be accessed by appending the corresponding relative file path to the local_url.

provider_data: an associative array containing provider_specific <name, value> pairs that the provider supplied when the object was published. These values are used by the provider to render the web page. They are obtained from the corresponding <PARAM Name="xxx" Value="xxx"/> constructs in the configuration index published by the provider. This field is absent if there is no provider_specific data associated with the object.

An example list of cached objects is given in the following below.

```
var jibe_cached_objects={
    "http://jibe.tv/content/essentials/banner.wmv": {
        provider: "jibe.biz",
        status: "completed",
        content_type: "video/x-msvideo",
        content_length: 10000, // size of this content object in bytes
        cached_bytes: 10000, // number of bytes that are currently available in cache
        local_url: "file:///C: \\Program Files\\Jibe Networks\\jibed\\jibecache\\893485.wmv"
    },
    "http://jibe.tv/content/shortfilms/thread.avi": {
        provider: "jibe.biz",
        status: "inprogress",
        content_length: 29519872,
        cached_bytes: 187366,
        local_url:
        "http://localhost:26138/http://jibe.tv/content/shortfilms/thread.avi", provider-data: {
            "title": "Thread",
            "duration": "00:03:57",
            "description": "Unapix/Miramar-Simitar Entertainment",
            "thumbnail": "http://jibe.tv/content/shortfilms/thread.jpg",
            "embedding_url": "http://jibe.tv/content/shortfilms/thread_emb.shtml",
            "thumbnail_icon": "http://jibe.tv/content/shortfilms/thread.jpg"
        }
    }
    // . . . other objects
};
```

A jibe_subscribed_chapters variable may be used and is an associative array containing names of chapters to which the user is currently subscribed. In one embodiment, the following properties are associated with each subscribed chapter:

provider: the name of the provider that published the chapter.

status: one of three strings: "unknown", "active", or "inactive". When the chapter is first subscribed to, its status is "unknown". If the NOC verifies that this is a valid published chapter, its status changes to "active". If the NOC does not find a valid chapter that is currently published, its status is marked as "inactive". The user may be automatically unsubscribed from a chapter that has been inactive for a long time (e.g., on the order of a month). This field can be used to alert the user to the existence of chapters that are no longer active so s/he may unsubscribe.

cache_size: the current amount of local disk cache space, in bytes, that have been dedicated to the chapter. This is usually equal to the min_cache_size that was specified when the chapter was first subscribed to; it may, however, be larger if the user decides to dedicate more disk space to the chapter. Note that not all of this space may be available if the user's disk is full.

cache_used: the number of bytes of this chapter's cache that are currently in use by cached objects belonging to this chapter.

preferred_server: this is an optional field that contains the preferred server that was specified at the time the chapter was subscribed to. If an object is available from multiple locations, this field allows the provider to specify (on a per-machine/per-chapter basis) which server to use for downloads to that host.

cached_objects: an array containing the objects belonging to this chapter that are currently (partially or completely) in cache. To obtain the full download status of these objects, a look up is made to obtain its name in jibe_cached_objects (see above).

provider_data: an associative array containing provider-specific <name, value> pairs that the provider supplied when the user subscribed to this chapter (see the jibe_url_for_chapter_subscriptions( ) function below for more details). This field is absent if there is no provider-specific data associated with the chapter.

An example of the jibe_subscribed_chapters variable is given below:

```
var jibe_subscribed_chapters={
    "jibe.tv/shortfilms": {
        provider: "jibe.biz",
        status: "active", //"active"|"inactive"|"unknown"
        cache_size: 6350506218,
        cache_used: 1982773,
        preferred_server: "jibe.tv",
        cached_objects: [
            "http://jibe.tv/content/shortfilms/blueangels.avi",
            "http://jibe.tv/content/shortfilms/thread.avi",
            "http://jibe.tv/content/shortfilms/truenorth.avi"
        ],
        provider_data: {
            "chapter_title": " ",
            "site_title": " ",
            "tray_icon": " ",
```

```
    "embedding_url": " ",
    "open_embedding_url_with": " "
  }
 }
}
// ... other chapters
};
```

One Embodiment of An Architecture for Content Precaching

Figure 2:
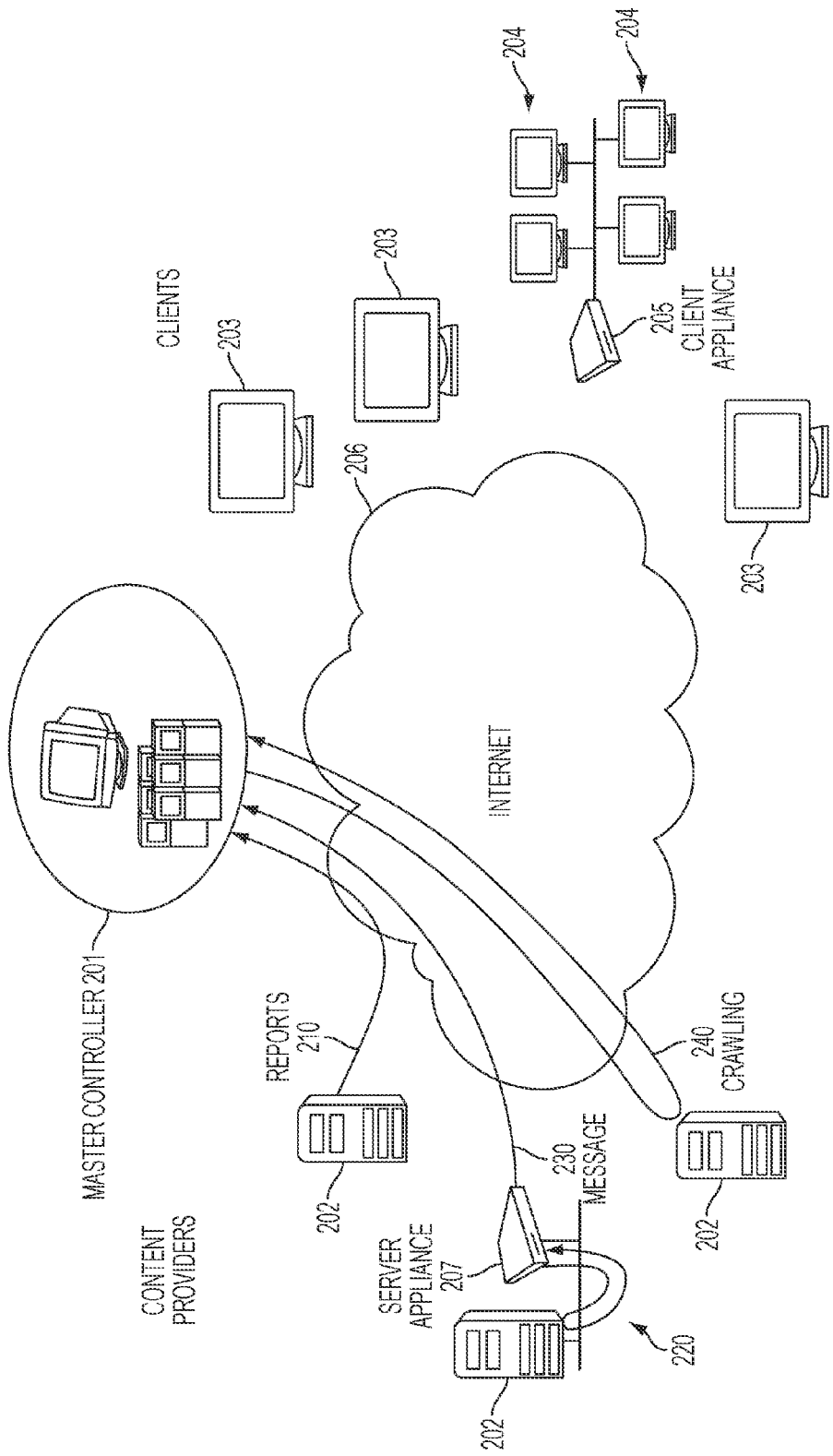

The teachings described herein may be utilized in a networked environment that supports content precaching. FIG. 2 illustrates one exemplary embodiment of an architecture for content precaching. Referring to FIG. 2, one or more content providers (e.g., web servers, video servers, audio servers, etc.) 202 are coupled to the Internet 206 or another networked environment. One or more clients 203 is coupled directly to Internet 206, or indirectly coupled to Internet 206 through a client appliance 205.

Clients 203 or 204 may comprise a PC, a work station, a network appliance device, a web pad, a wireless phone or other communication device, a set-top box, etc. Client appliance 205 may be implemented on a service gateway (e.g., a router, bridge, switch, other network device) in the LAN or as an end point on the LAN. Clients 203 or client appliance 205 may run software and reside in a LAN or other networked environment. In one embodiment, the precache memory is part of client 203. In another embodiment, the precache memory is part of client appliance 205, or on another client machine that is linked to client 203 by way of a LAN or some other networking subsystem.

Client 203 or client appliance 205 may be coupled to the Internet by a modem link, a digital subscriber line (DSL), cable modem, (fixed) wireless connection, fiber, etc. This coupling may be either a direct connection, or indirectly connected through a router, switch, or other similar device.

One or more clients may be peers. A peer is a "nearby" or local host, such as, for example, a host in the same LAN, a host connected to the same ISP, or any other networked device offering reasonable connectivity (e.g., bandwidth, latency). In FIG. 2, any or all of clients 203 or client appliances 205 may be in peer relationships with each other.

Master controller 201 is coupled to Internet 206 or some other networked environment. In one embodiment, master controller 201 is a server host or cluster of server hosts along with storage (e.g., network-attached storage, database engines), and typically resides in a controlled environment at one or a few locations strategically placed in the Internet to allow for reasonable connectivity.

In one embodiment, the precaching described herein involves building a user profile, subscribing for update notifications for new content (e.g., objects) based on information in the user profile, downloading the new content, and intercepting user's requests for a web server to transparently return the content to the user. As described in more detail below, a user profile may be built by tracking user access patterns, receiving profile information from another entity, and/or being configured with a profile (or portion thereof) from a user.

A client may subscribe for an update of new content based on information in the user profile. In one embodiment, periodic checking is performed to obtain an update of new content and includes sending the requests to the controller, which determines if there are any new content objects that correspond to content specified in the profile. A determination of whether new content exists may be performed by querying a master controller, subscribing with the master controller, and/ or crawling the networked environment. Each of these will be described in more detail below.

In one embodiment, to facilitate the precaching process, the master controller maintains one or more databases of available objects and the locations of the objects. As new content becomes available, the controller searches the database of client profiles to determine the set of clients that will want a copy of the new content. The controller sends a message to each of the clients in the set to instruct them to download the content. The message contains the location from where an object may be downloaded to the client making the request. When the content has already been downloaded by a peer client, the controller may indicate to the other clients making the request that the peer client has the content and provides an indication to allow the requesting client to download the content from the peer client. Thus, in such a case, there is peer-to-peer precaching.

In an alternative embodiment, the controller checks for new content, in response to a request by a client, by searching one or more database(s) to determine if the content object has been already downloaded by a client in the system.

In one embodiment, the clients run on a platform and maintain profiles. A client may be an end point of a network or one or multiple hops away from the end point of a network (e.g., a local area network). By forwarding its profile to the controller and having the controller indicate when to download new content objects, the client is able to obtain and precache content objects prior to web browser or other end user program requests based on profiles. The content objects are downloaded and stored in a precache memory (or disk) when the network access link is not being used interactively.

When a web browser or other end user program makes a request for a content object, the client intercepts the request and checks to determine if it has the content object stored locally. If it is stored locally, then the client obtains the content and sends the content object to the browser or other end-user program using any inter-process communication (IPC) mechanism; in doing so, the object may simply be transferred to another task, process, or thread running on the same machine as the client, or it may travel over a local network (e.g., LAN) to a different machine that is running the browser or end-user program. If the content object is not available locally, then the client retrieves the object, or a low-quality representation of the object, over the wide area network from any server which hosts the content object.

Thus, each of the clients sends a profile to the master controller (NOC). The master controller gathers information about new objects being published and compares this to the profiles of each client to determine which objects the client's should download. The information of more objects being published may come from content servers. In other words, the master controller indicates to the client(s) when to download specific objects (and when to delete content). The master controller provides this indication in the form of commands. In other words, after downloading, each client has a collection of cached objects residing on disk, which is managed by the master controller.

Discovery of Content

Master controller 201 can discover content that becomes available at content servers 202. One way in which new content can be discovered is through direct reports 210 coming from content servers 202. Such direct reports 210 could be generated periodically, or in response to an event on server 202 (e.g., new content being placed on the server by the server administrator). Direct reports 210 are usually generated by software running on servers 202.

Another way in which master controller 201 can discover the availability of content on content servers 202 is by use of a server appliance 207 that is co-located on the server 202's site, or close to it. Server appliance 207 can locally crawl (220) through the content on server 202 frequently to check for the availability of new content. It can then report new changes, or provide a summary of all content on server 202, by sending messages 230 to master controller 201. In this context, the server 202 need not run any special software that can communicate directly with the master controller.

A third way in which master controller 201 can discover the availability of content on content servers 202 is by directly crawling (240) the content available on content server 202. This crawling operation 240 is similar to the way in which web search engines retrieve files from an Internet web server.

Figure 3:
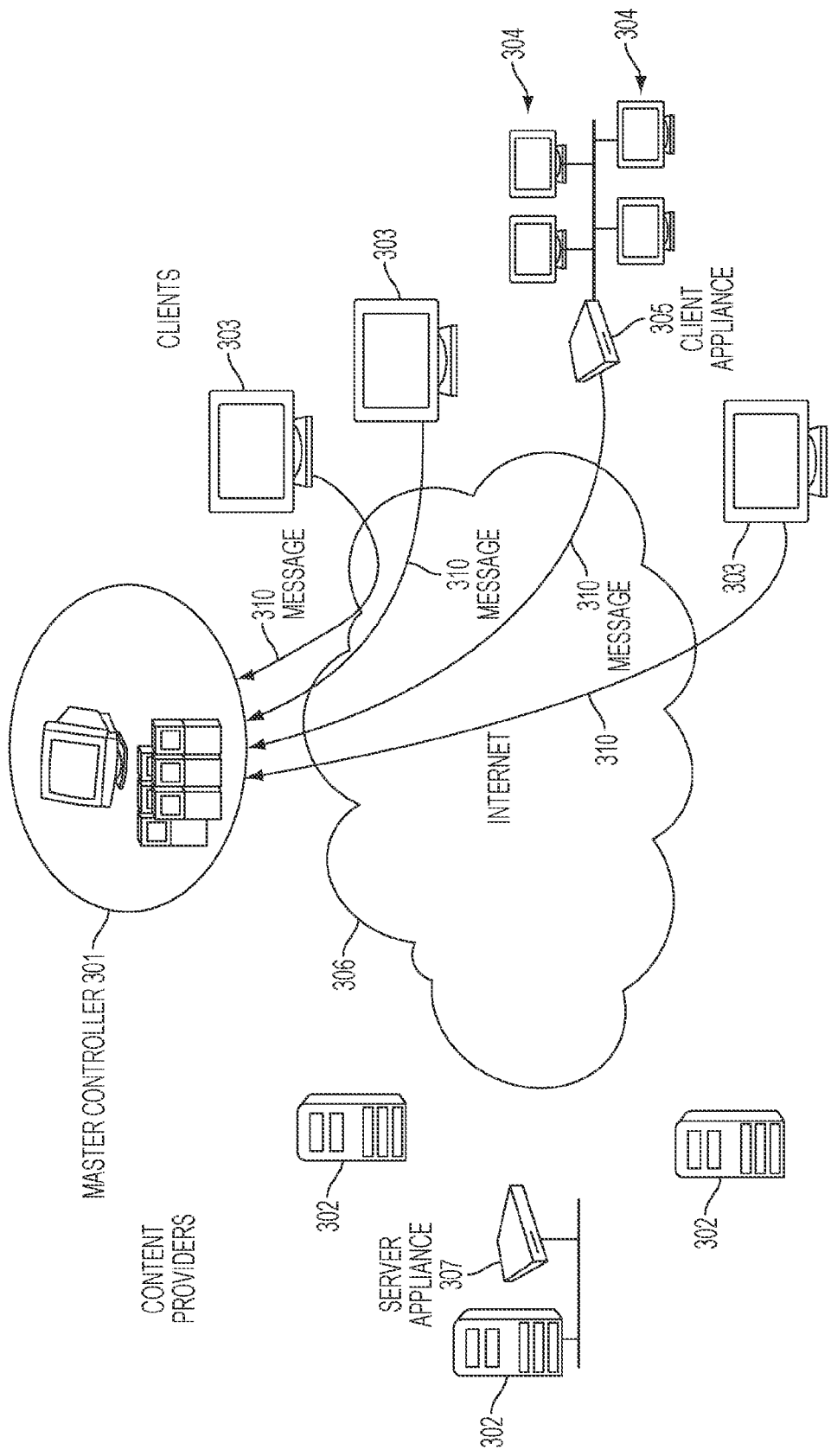

FIG. 3 is an alternative view of FIG. 2 illustrating the gathering of profiles. Referring to FIG. 3, clients 303 maintains profiles for local users. In one embodiment, the profile is built based on observing user access patterns, and from those access patterns, determining what types of content the end user will want to access in the future. In another embodiment, the profile may be built up or augmented by information provided directly by the master controller 301 or the end users or both. A local network administrator may also add to the profile.

Profiles for one or more clients 304 may also be maintained by a client appliance 305. In this case, it would not be necessary for clients 304 to run special software to collect and report profiles.

Clients 303 report on the profiles they maintain to master controller 301 using messages 310. Similarly, client appliances 305 report on the profiles they maintain to master controller 301 using messages 320. Messages 310 and 320 can be generated periodically, or in response to some event (e.g., a request from master controller 301).

Figure 4:
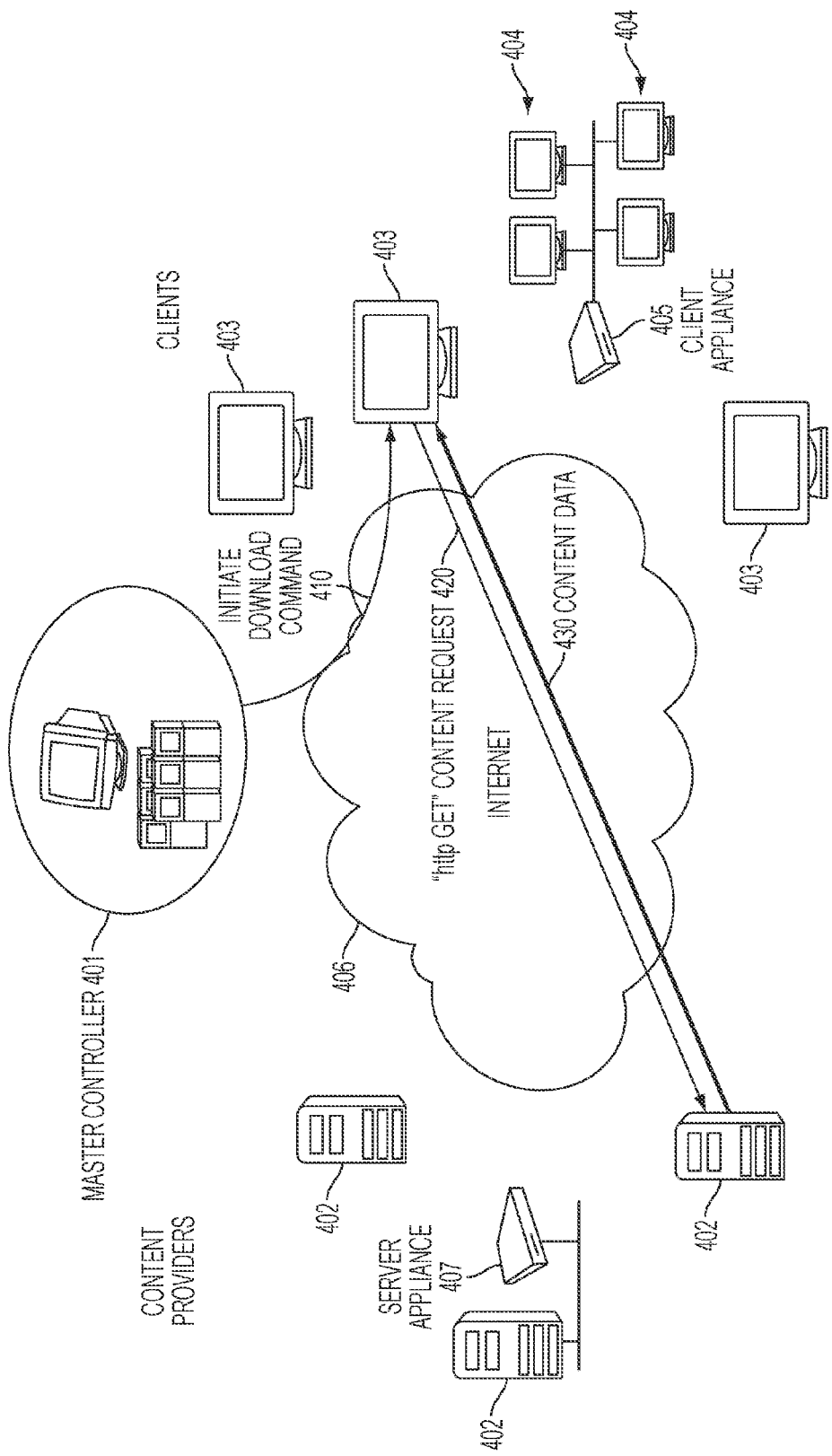

FIG. 4 is an alternative view of FIG. 2 illustrating the initiating of downloads directly from the server. Referring to FIG. 4, master controller 401 uses its knowledge of what content is available on content servers (as described in FIG. 2), and its knowledge of client profiles for different clients 403 and 404, to initiate downloads of content that will likely be needed in the future at clients 403 and 404. Master controller 401 sends messages 410 to clients 403 and client appliances 405 which contain commands to initiate downloads of content data from locations 402 specified in the messages 410. Clients 403 then send a message 420 to the content server 402 from which the content is to be downloaded. Content servers 402 then respond to these download requests 420 by returning the content data 430 to clients 403. Client appliances 405 retrieve content data from servers 402 in a similar manner.

Figure 5:
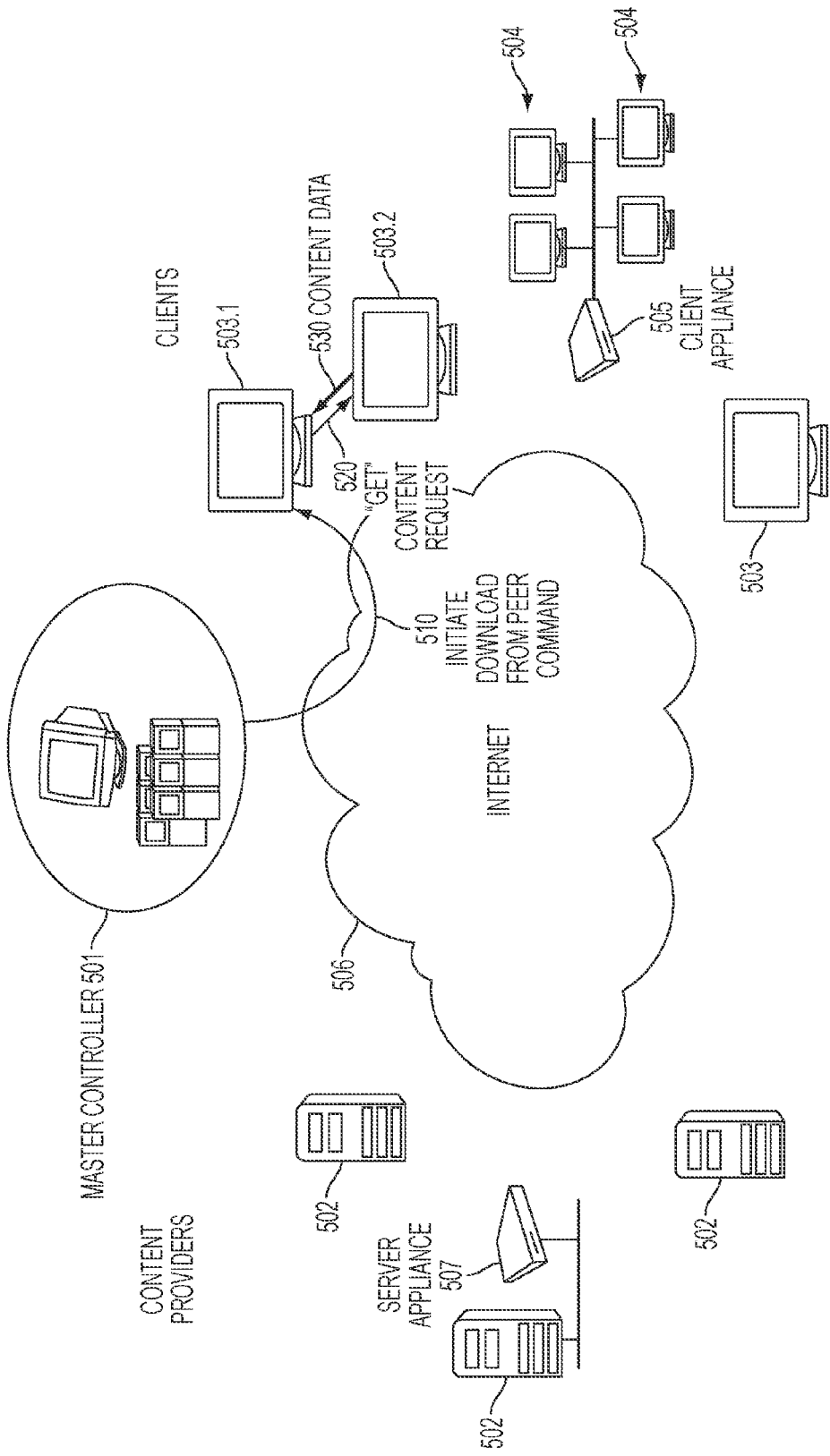

FIG. 5 is an alternative view of FIG. 2 illustrating initiating downloads from peers. Referring to FIG. 5, master controller 501 uses its knowledge of which clients 503 and client appliances 505 have already downloaded specific content objects to initiate downloads of content directly from a peer client. In one embodiment, master controller 501 sends a message 510 to client 503.1 to initiate download of a content object from peer client 503.2. Client 503.1 sends a message 520 to peer client 503.2 to retrieve the specified content. Client 503.2 then acts as a content server by responding to request 520 by sending the specified content data 530 directly back to client 503.1. In another embodiment, master controller 501 can send a command to a client to upload a specified content object to a specified peer client; this is useful when the client sending the content data cannot be directly contacted by the requesting client, perhaps because it resides behind a firewall. Client appliances 505 can get content from peer clients 503 and/or other client appliances in a similar manner.

In an alternate embodiment of the invention, clients 503 or client appliance 505 may directly query the master controller 501 for new content objects that match their local profiles, and receive from the master controller 501 a list of the new objects that are available, as well as their locations (e.g., content servers 502, peer clients 503, or peer client appliances 505). These queries may occur periodically or in response to some external event (e.g., a request from the master controller). Clients 503 or client appliances 505 can then select a suitable location to directly download the content from. In this embodiment, master controller 501 need not maintain profiles for all the clients, and messages 310 and 320 would be unnecessary.

In one embodiment, master controller 501 knows four things: 1) the content clients want based on profiles received from clients; 2) the new content that is available; 3) the location of the new content (e.g., servers, carrier edge caches, peers, etc.); and 4) network information such as, for example, network connectivity (e.g., network topology information, bandwidth, delay, and dynamically changing snapshots of network congestion and/or utilization). Using this information, master controller 501 schedules downloads of new content objects to clients 503 and client appliances 505. Such downloads may take the form of commands such as, for example, "get object from server 1" or may take the form of instructions such as, for example, "instruct client 2 to obtain the object from client 1". The network information and information about which downloads are taking place allow master controller 501 to do provisioning taking into account resource availability.

In one embodiment, master controller 501 is able to coordinate downloads so that prior to a download of content completing to a particular client, another download of that content may start occurring form that particular client. This kind of pipelining of downloads can significantly reduce the delay before a content object is replicated to a potentially very large number of clients and/or client appliances.

Clients 503 download content objects from the locations specified in messages 410 or 510 from the master controller. For example, in one embodiment, client 503 may download bandwidth intensive content such as, for example, movies, video, software, images, sound files, etc. Client 503 stores the content locally in one or more precache memories. The precache memory may be part of a client 503 (or is at least accessible by it over a fast link, for example, over a LAN). The content may be downloaded on the end user's premises. In one embodiment, the downloading occurs without excessive interference with any other interactive network traffic.

A user request may be generated (e.g., from a web browser) to download specific content from the network. Client software running on an end system can observe these requests. Alternately, a client appliance can observe such a request originating from an end system to which it is connected (e.g., through a LAN). Clients or client appliances monitoring these requests can detect when the request is for a content object that is in the local precache memory of the client or client appliance. If such a request occurs, clients or client appliances can satisfy the request by returning the stored (precached) content object from its local precache memory. If the request is for a content object that is not in the precache memory clients or client appliances can forward the request on to their original destination (e.g., content server, carrier-edge cache, etc.). Thus, requests for a specific type of bandwidth intensive content are intercepted. In one embodiment, clients and client appliances are configurable to intercept requests for a certain type of content object.

Thus, with content cached locally, clients and client appliances detect requests for embedded objects, check their precache memory to determine if the embedded objects are stored locally, and return the object from the precache memory if available. If the content is not available, the request is sent out into the network (e.g., Internet) to an appropriate location where the content or an alternate representation of the content may be found.

Presentation of Objects

As discussed above, the techniques described herein allow for presenting information in useful ways to a user. In one embodiment, pages are generated dynamically using a local approach. In the local approach, the web page is dynamically generated based on information at the client. In other words, the resulting page that is rendered is based on local information, not content provider (e.g., server) information. The dynamic generation of the content object allows different versions of the object to be displayed based on the information at the client. For example, the page may only be displayed with objects that are already cached. For another example, the pages may be displayed with a particular logo on an object to indicate the object is in the cache or may have cached objects displayed differently (e.g., more prominently) than non-cached objects.

In the local approach, the content provider supplies the web page. As the web page comes to the client, the browser's request information from an agent running on the client (i.e., the object agent) to determine if objects set forth therein are cached locally and sends information to the browser regarding the cached objects so that the browser can change the web page to reflect information from the profile and the cached object(s). In one embodiment, the web page contains a program, or script. In one embodiment, the program may comprise Javascript or another scripting language.

Subscribing to Chapters

In one embodiment, content providers can make a user subscribe to a chapter by providing a "subscribe" link on any of their web pages. In one embodiment, when a user clicks on a link, the client goes to the site and the site provides an indication of how to add a chapter to his/her profile. When the user clicks on this link to add a chapter to the profile, instead of going to the remote web site, the user is taken to the middleware agent running on the same machine. This agent returns a page asking the user to confirm whether they want to subscribe to the chapter. The page may result in a pop-up dialog, or it could be a normal web dialog. When the user hits the "confirm" button, the chapter is added to the profile.

An Exemplary Protocol

Figure 6:
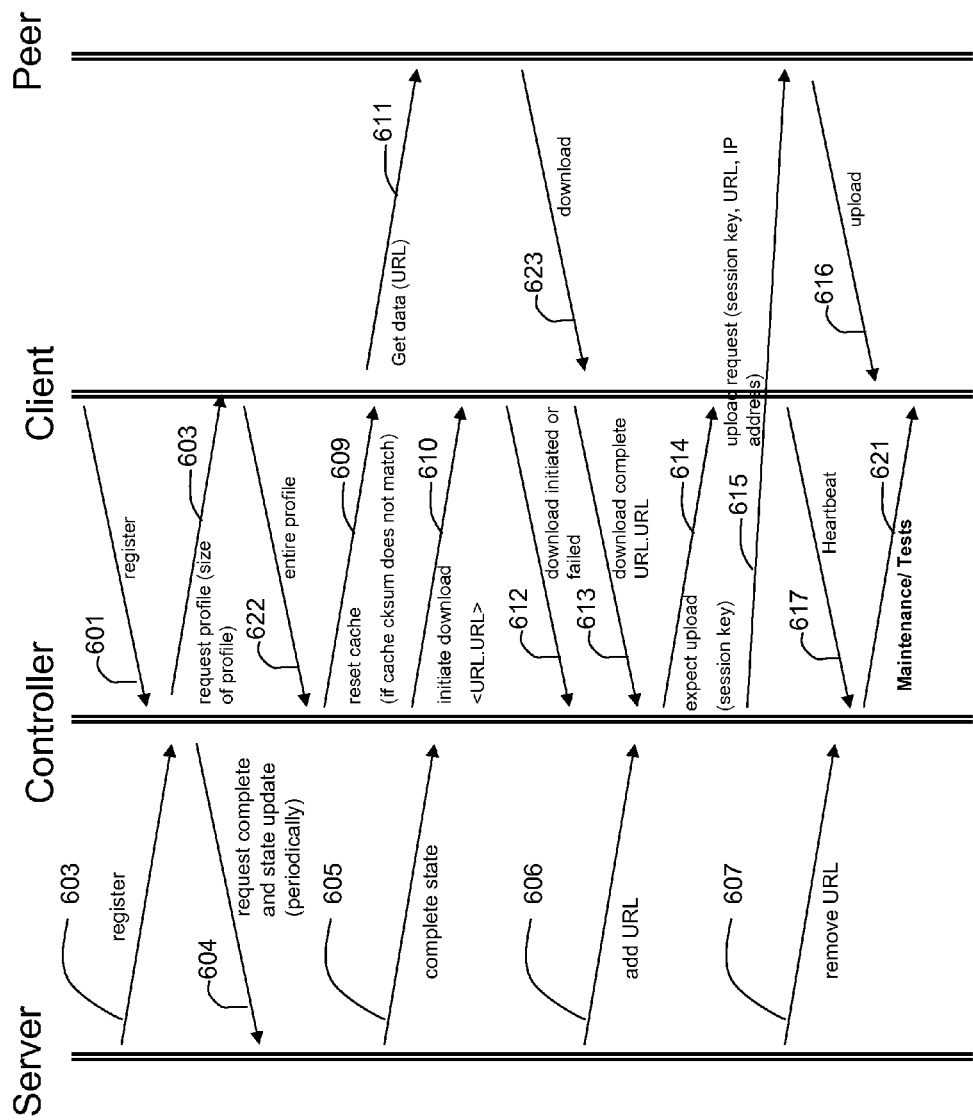
FIG. 6 is an exemplary protocol to facilitate precaching.

FIG. 6 illustrates one embodiment of a protocol for exchanging information between master controller 501 and a client, a server, and a peer. Referring to FIG. 6, initially, when the client first boots up, the client registers (601). Registration by the client involves sending information to enable master controller 501 to coordinate the precaching activity.

In one embodiment, once registration has been completed, all but one of the remaining operations are controlled from master controller 501 (e.g., in response to a NOC request or message). Thus, master controller 501 sends a, request to which the client replies, with the exception of one situation.

After registration, master controller 501 requests the profile from the client (602). In one embodiment, master controller 501 indicates the size of the profile it is willing to accept or is able to accommodate. Then the client sends the profile to master controller 501 (622). In one embodiment, the profile is a list of content objects (e.g., 50 to 100 URLs) in order of access frequency, with content objects that are accessed more often being at the top of the profile. If the profile is larger than the maximum specified by master controller 501, the profile may be made smaller by the client by removing links that have been accessed less frequently (e.g., that are at the bottom of the list of links).

Similarly, master controller 501 communicates with the web servers (e.g., content providers). A server registers with master controller 501 (603). In response to the registration, master controller 501 requests state information from the server (604). This request may be generated by master controller 501 periodically while the server remains registered. In response to the request, the server sends state information (605). The state information may include a listing of all content objects that are linked through the sites. The list may be limited to only those content objects that are rich media objects or bandwidth intensive objects in terms of downloading. Every time new content is added or removed, the server sends an add message (606) or a remove message (607) to master controller 501 to update the list (e.g., in a database) master controller 501 maintains of the content objects linked through the site.

In one embodiment, master controller 501 initiates one or more maintenance tests on the client (621). These tests are well-known in the art. For example, master controller 501 can request traceroutes from this client to some other Internet address or a bandwidth test from the client to a different Internet address. Master controller 501 uses these tests to determine network connectivity and resource availability: With this information, master controller 501 is able to obtain information about the network topology, a network map, etc., as listed above. Note that such information may be provided to master controller 501 directly without the need of testing to discover it. At this point, master controller 501 has information about network topology, information about server size state, and information about clients.

In one embodiment, master controller 501 may send a reset cache message (609) if a cache checksum doesn't match a previously defined or calculated value.

Master controller 501 keeps track of where the content is. Specifically, master controller 501 keeps track of a particular content piece (e.g., video clips) and the identity of the servers and/or clients on which it is located. Occasionally, master controller 501 determines that a client is to download some object from a location and at this time, master controller 501 sends an initiate download message (610) to the client that identifies an object and the object's location. In one embodiment, the initiate download message includes the name of the object (e.g., universal resource identifier (URI) and its natural location (e.g., a URL corresponding to its location on the server of its origin, a URL corresponding to some peer client, etc.)).

In response to the download message, the client initiates the download by sending a get data command to a peer (611). After the peer begins to send the data (623), the client sends a message to master controller 501 indicating that the download has started (612). The download may take a while. Once the download has been completed, then the client sends a message to master controller 501 indicating that the download has been completed (613). This allows master controller 501 to know which downloads are occurring at any time.

In case the peer is behind a firewall, then the client cannot connect to the peer directly and download the data from behind the firewall. In that case, master controller 501 sends a message (615) directly to the peer to indicate that the peer is to upload the new content to the client. Master controller 501 also sends a message to the client to expect an upload (614) from some peer. A particular session key or number may be used to correlate uploaded information received by the client from other peer clients with the correct download identified by master controller 501. The peer sends the upload (616). Finally, the client sends a heartbeat message (617) to master controller 501 so that master controller 501 knows that the client is up in and running.

In one embodiment, the messages are small. Therefore, because almost all requests come from master controller 501, master controller 501 is able to schedule all the downloads to ensure that no single client or network link is being overloaded.

Building User Profiles

The client creates a profile for an end user that is coupled to the client. The profile may comprise a list of resource locators (e.g., URLs), object type, object size, and a time stamp associated with the URLs to provide information as to when the end user accessed the resource. In one embodiment, the profile comprises URLs and access times, identifying web sites or portions of web sites, and when the user tends to access them.

Profiles may be configured by, or built, using input from a network administrator or manager, such as master controller 501 in the NOC. For example, the master controller 501 could add or remove URLs and access times. To make a change to the profile, the client would be accessible via the network, such as by, for example, an Internet service provider (ISP), application service provider (ASP), or content provider, and the profile could be configured through that access. An example of its use might be where the ISP provides a service by which a video movie is provided once a day to an end user. The individual could choose to watch the movie or not because the movie would have been already downloaded. Profiles may also be configured by a content server or a content provider.

Alternatively, the profile may be manually set by an individual, such as, for example, the user. The user may provide the specific URLs and access times manually to the profile. For example, if a user checks a set of web sites at a predetermined time during the day, the user can configure the network access gateway to access the web sites prior to that time each day to obtain updated or new content. Such additions to the profile augment the accuracy of the precaching.

A profile may be developed for a user using a combination of two or more of these profile building methods. Further priorities can be assigned to URLs stored in the precache memory in case of conflicting access times. In one embodiment, user configured URLs have priority over learned URLs (developed from tracking user access patterns) and network administrator configured URLs (e.g., from master controller 501).

In one embodiment, only one precaching client is running on a system at any one time. An open application program interface (API) to the profile may be provided to allow third parties to add URLs to user profiles, to schedule downloads, and to use the services provided by the precaching architecture for their applications.

Locating New Content

In one embodiment, clients may check for new content by subscribing with master controller 501 in the NOC. Clients 503 can subscribe with master controller 501 to get automatic notification when new content becomes available. This is advantageous on large web sites with millions of clients because it reduces, or even minimizes, time and resources used in crawling.

Using the information stored in the user profiles, master controller 501 periodically checks for new content. To facilitate this, client 503 may have previously passed updates to its profile, such as shown as arrow 310 in FIG. 3. Master controller 510 maintains a list of web sites and their embedded media objects. This list is compiled by using updated information from content providers 502, such as, for example, shown as arrows 210 and 230 in FIG. 2, or by crawling web sites from the NOC, such as shown as arrow 240 in FIG. 2. The crawling process is similar to the way in which some Internet search engines create indices of web pages.

In one embodiment, content providers 502 support the system by periodically crawling locally all available web pages on their servers to look for new object content. This local crawl can be implemented by software, hardware or a combination of both.

The content providers 502 provide a summary of changes to master controller 501. Alternatively, such information may be provided directly to a client. The summary information may comprise the link, time, type and size of each object. The summary may include a list of URLs for those objects. The master controller compares the content in the list with the profile information (e.g., the list maintained by the network access gateway) to determine what content has changed and therefore what content, if any, is to be downloaded. In one embodiment, the result of the local crawl is made available in a special file, namely an update index. Master controller 501 analyzes the update index to find the new download candidates. In one embodiment, content providers 502 manually build an update index.

Master controller 501 collects and aggregates the summaries. In one embodiment, each content provider 502 sends the summary to master controller 501. In such a case, all the clients need only contact one server to download summary information for groups of participating content servers in the network. In one embodiment, master controller 501 may unicast or multicast the information to one or more clients 503.

In an embodiment in which clients maintain their own profile, such as described in U.S. application Ser. No. 09/566,068, entitled "Intelligent Content Precaching," filed May 5, 2000, assigned to the corporate assignee of the present invention and incorporated herein by reference, clients 503 directly crawl a web site and search for new content objects. Clients 503 perform a crawl operation by periodically checking web servers indicated in the profile for new or updated content objects that it believes end users or other local devices will be accessing in the near future. In one embodiment, in such a case, a client begins with a URL stored in the profile and follows links into web pages down to a configurable level.

In one embodiment, the controller obtains the first page from the server and determines if any bandwidth intensive objects are present. In one embodiment, a bandwidth intensive object may be identified by its size. If bandwidth intensive, embedded objects exist, the controller determines if new versions are available and downloads them. When new content objects have been identified, the controller indicates to the client to download only the bandwidth intensive (e.g., large), new content objects (as they become available). The content objects obtained as a result of crawling are stored locally. In one embodiment, the precache memory storing such objects also stores their URLs, data type, size, the time when the data was acquired and the actual data itself. This process is transparent to the network and no change is needed to the content servers or the network to operate the precaching client.

In an alternative embodiment, each new and/or updated content object is downloaded independent of size (after determining if the content object is a new version).

Some or all of these crawling techniques may be used in the same networked environment. For example, client 503 may crawl one or more sites to determine if any of the content objects have changed, while receiving information from master controller 501 or web servers employing a mechanism to crawl their sites to identify updated or new content and while caches in the network or content servers provide updated and new content to the client 503.

Downloading

Master controller 501 in the NOC maintains a database of available objects and their physical location. When a new object is available for downloading to client 503, master controller 501 determines the most suitable location from which client 503 may download the object. In one embodiment, master controller 501 does this by analyzing the database and the client's Internet protocol (IP) address, and relating this to network topology, map, and connectivity information known to it. A scheduler in the NOC returns a download trigger to client 503. The trigger provides information to enable client 503 to download the object. This trigger information, or pointer, may comprise a location and an object name (e.g., URL).

A requested object can be downloaded from a variety of sources, e.g. a peer, a carrier edge cache, or the original server. In FIG. 5, arrow 530 represents a download from a peer. Management controller 501 determines the most suitable host based on parameters. In one embodiment, these parameters include peer-to-peer hop count and bandwidth.

If no suitable peer is available (e.g., if the request is the first request for an object or if suitable peers are too far away), the object can also be downloaded from a server installed on the carrier edge if the content provider supports carrier edge caching. If there is no suitable peer and no cache can be found, the object is downloaded from the original content provider server 502. Client 503 downloads the object in the background without excessively interfering with interactive traffic, regardless of the location from which it downloads.

Applications

The peer-to-peer precaching technique facilitates provision of premium services, such as explicit downloads, mapped content, aggregated access statistics, etc. The premium service of explicit downloads is done by triggering operations (potentially at regular intervals or at specific times) to pull the customer's content (e.g., all new clips on a web site immediately go to all sites with the web site's URL in their profiles).

Mapped content allows customers to offer dense content dedicated to precache-enabled users. In one embodiment, this is implemented by offering a separate high resolution file of a video clip which is not linked into any web page, but is available to the master controller when it checks a target web site for new content. When the user clicks on a video icon on a web page, the transparent precache technology delivers the high resolution version instead of the potentially low resolution version.

In aggregated access statistics, access statistics and user profile statistics are provided to content providers and distributors. For example, individual user access profiles on the customer premises are retained, with the statistics being reported. By only reporting the aggregated statistics, privacy concerns are avoided.

Besides enhancing traditional web sites with high-quality video, the precaching technique can be applied in other areas, such as advertising, and DVD on demand. Running decent quality video advertising over the Internet has not been possible so far. A broadband connection can barely deliver a single low-quality video stream, and consumers would certainly not want video ads to eat up their interactive bandwidth. Thus, advertisers are currently limited to using "banner ads," which are mostly implemented as blinking images (animated GIFs). With precaching, advertisements can be downloaded while the link is not used otherwise. Thus, full motion ads can be downloaded in the background, and embedded in web pages, without exhausting the interactive bandwidth. The peer-to-peer video precaching technique helps advertisers to succeed in their hunt for eye balls. In addition, the precaching technique allows the advertisers and content providers to retain their ability to keep track of the number of "hits" of the embedded ads.

The precaching technique also makes online distribution of DVD video feasible. The hassle with late fees, midnight video store runs and rewinding charges would be avoided using an online renting model. MPEG2 video, the coding standard used on DVDs, requires an average bandwidth of 3.7 Mbits/sec. The average length of a DVD movie is two hours. An average movie needs approximately 3.5 Gbytes of disk space. Over a 500 kbits/sec Internet connection, three hours of DVD-quality movie can be downloaded in 24 hours. If the connection is twice as fast (e.g., 1 Mbit/sec), three full DVD movies can be delivered over the Internet in a day.

Thus, a technique of personalized content delivery using peer-to-peer precaching has been described. In particular, this technique saves content providers bandwidth on their server farms and carrier edge caches. It also improves the interactive experience of a large number of web sites. While the previous discussion focuses on clients running on end system PCs, the technique can be implemented to run in access gateways, home gateways, set-top boxes, etc.

An Exemplary Computer System

Figure 7:
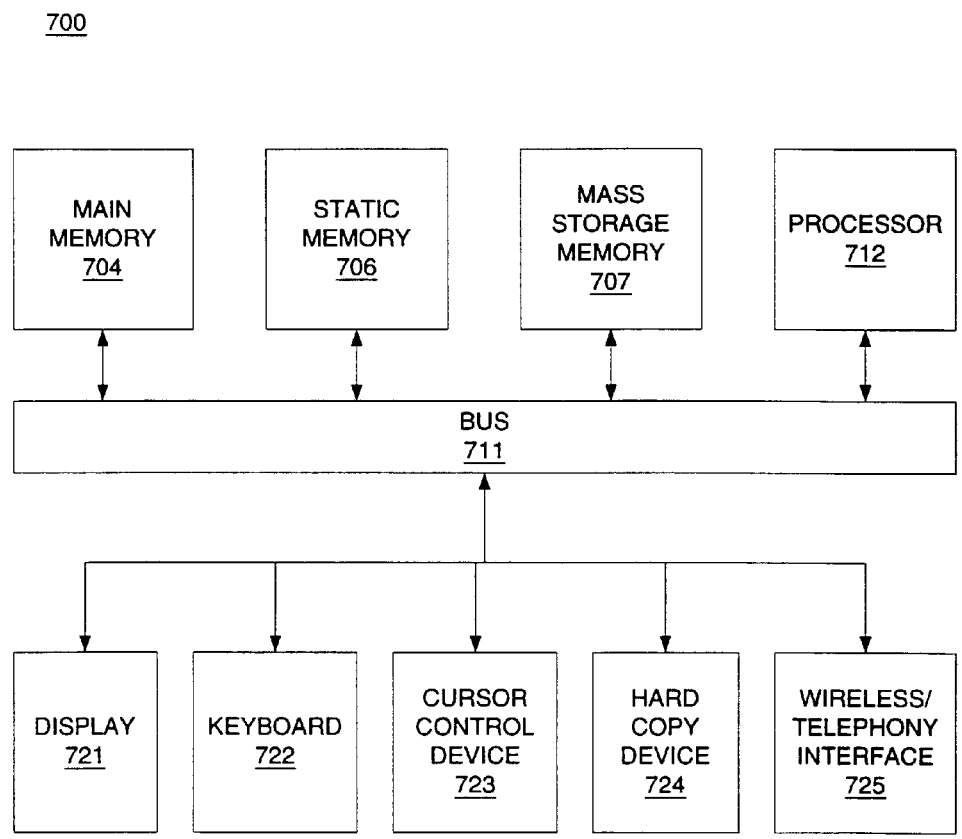
FIG. 7 is a block diagram of one embodiment of a computer system.

FIG. 7 is a block diagram of an exemplary computer system (e.g., PC, workstation, etc.) that may be used to provide one or more of the operations described herein. Referring to FIG. 7, computer system 700 may comprise an exemplary client 503 or server 502 computer system. Computer system 700 comprises a communication mechanism or bus 711 for communicating information, and a processor 712 coupled with bus 711 for processing information. Processor 712 includes a microprocessor, but is not limited to a microprocessor, such as, for example, Pentium™, PowerPC™, Alpha™, etc.

System 700 further comprises a random access memory (RAM), or other dynamic storage device 704 (referred to as main memory) coupled to bus 711 for storing information and instructions to be executed by processor 712. Main memory 704 also may be used for storing temporary variables or other intermediate information during execution of instructions by processor 712.

Computer system 700 also comprises a read only memory (ROM) and/or other static storage device 706 coupled to bus 711 for storing static information and instructions for processor 712, and a data storage device 707, such as a magnetic disk or optical disk and its corresponding disk drive. Data storage device 707 is coupled to bus 711 for storing information and instructions.

Computer system 700 may further be coupled to a display device 721, such as a cathode ray tube (CRT) or liquid crystal display (LCD), coupled to bus 711 for displaying information to a computer user. An alphanumeric input device 722, including alphanumeric and other keys, may also be coupled to bus 711 for communicating information and command selections to processor 712. An additional user input device is cursor control 723, such as a mouse, trackball, trackpad, stylus, or cursor direction keys, coupled to bus 711 for communicating direction information and command selections to processor 712, and for controlling cursor movement on display 721.

Another device that may be coupled to bus 711 is hard copy device 724, which may be used for printing instructions, data, or other information on a medium such as paper, film, or similar types of media. Furthermore, a sound recording and playback device, such as a speaker and/or microphone may optionally be coupled to bus 711 for audio interfacing with computer system 700. Another device that may be coupled to bus 711 is a wired/wireless communication capability 725 to communication to a phone or handheld palm device.

Note that any or all of the components of system 700 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for displaying a web page using locally stored content, the method comprising:

receiving, by a browser running on a client machine, a web page to display, a first portion of the web page comprising one or more hyperlinks to one or more content objects and a set of instructions, the set of instructions comprising an instruction to load a script file by the browser, and a remainder of the web page comprising a hyperlink that includes a destination portion identifying a remote location for a content object of the one or more content objects generating, by an agent running on the client machine, the script file containing information about one or more content objects stored on the client machine; wherein the script file comprises information identifying a remote location of each of the one or more content objects, a location on the client machine of at least one of the one or more content objects, and a download status of each of the one or more content objects indicating whether or not the respective content object is completely downloaded to the client machine;

determining, by the agent in communication with a master controller, whether or not there is a change in the download status of one of the one or more content objects;

responsive to determining a change in the download status of one of the one or more content objects, dynamically updating the script file by the agent;

sending, by the agent, the script file to the browser responsive to the browser executing the set of instructions of the web page;

executing the script file by the browser; wherein executing the script file loads the script file into memory of the browser;

determining, by the browser for each destination portion of the hyperlinks identifying remote locations for the one or more content objects in the web page, whether to replace the destination portion of the hyperlink with a second destination portion identifying a location on the client machine of the particular content object of the one or more content objects; wherein the determining is based on the information loaded by the script file and based on the download status of the particular content object of the one or more content objects;

responsive to determining, based on the script file, that the particular content object is located on the client machine and is completely downloaded, the browser modifying the web page by replacing the destination portion of the hyperlink of the particular content object, identifying the remote location for the particular content object, in the web page with the second destination portion identifying the location on the client machine of the particular object;

displaying, by the browser, the modified web page upon obtaining the one or more content objects to be replaced from the locations of the client machine.

2. The method of claim 1, further comprising determining, by the agent in communication with the master controller, changes to the one or more content objects from the location of the client machine and updating in the script the information about the one or more content objects from the location of the client machine.

3. The method of claim 1, further comprising dynamically generating, by the agent, the script identifying the one or more content objects from the location of the client machine and status information about the one or more content objects from the location of the client machine.

4. The method of claim 1, further comprising performing a check, by an agent running on the client machine, to verify whether the web page is in a valid domain.

5. The method of claim 1, wherein the one or more content objects comprise one of a web page, video file, image file, audio file, source code or executable code.

6. The method of claim 1, further comprising determining, by the browser responsive to the set of instructions of the web page and based on the information loaded by the script, to execute a first portion of the set of instructions to obtain the one or more content objects of the web page from a location of the client machine instead of executing a second portion of the set of instructions to obtain the one or more content objects of the web page from the remote location.

7. The method of claim 1, further comprising loading, by the script, in the browser a set of variables providing the information about the one or more content objects stored on the client machine.

8. The method of claim 1, further comprising generating, by the agent, the script comprising one or more of the following: an object name, an amount of the object in a cache, an object type, an object length, an object status, location information and provider data for at least one of the one or more content objects from the location of the client machine.

9. The method of claim 1, wherein the remote location comprises one of a server, a server appliance, a client appliance or a peer client machine.

10. A system for displaying web pages using locally stored content, the system comprising:

a browser running on a client machine receiving a web page to display, a first portion of the web page comprising one or more hyperlinks to one or more content objects and a set of instructions and a remainder of the web page comprising a hyperlinks that includes a destination portion identifying a remote location for a content object of the one or more content objects, the set of instructions comprising an instruction to load a script file by the browser;

an agent running on the client machine generating the script file containing information about one or more content objects stored on the client machine; wherein the script file comprises information identifying a remote location of each of the one or more content objects, a location on the client machine of at least one of the one or more content objects, and a download status of each of the one or more content objects indicating whether or not the respective content object is completely downloaded to the client machine;

wherein the agent in communication with a master controller determines whether or not there is a change in the download status of one of the one or more content objects and responsive to determining a change in the download status of one of the one or more content objects, dynamically updating the script file by the agent wherein the agent sends the script file to the browser responsive to the browser executing the set of instructions of the web page;

wherein the browser executes the script file; wherein executing the script file loads the script file into memory of the browser;

wherein the browser determines for each destination portion of the hyperlinks identifying remote locations for the one or more content objects in the web page, whether to replace the destination portion of the hyperlink with a second destination portion identifying a location on the client machine of the particular content object of the one or more content objects; wherein the determining is based on the information loaded by the script file and based on the download status of the particular content object of the one or more content objects;

responsive to determining, based on the script file, that the particular content object is located on the client machine and is completely downloaded, the browser modifies the web page by replacing the destination portion of the hyperlink of the particular content object, identifying the remote location for the particular content object in the web page with the second destination portion identifying the location on the client machine of the particular object; and wherein the browser displays the modified web page upon obtaining the one or more content objects to be replaced from the locations of the client machine.

11. The system of claim 10, wherein the agent determines, in communication with the master controller, changes to the one or more content objects from the location of the client machine and updates the information about the one or more content objects from the location of the client machine in the script.

12. The system of claim 10, wherein the agent dynamically generates the script that identifies the one or more content objects from the location of the client machine and status information about the one or more content objects from the location of the client machine.

13. The system of claim 10, wherein an agent running on the client machine performs a check to verify whether the web page is in a valid domain.

14. The system of claim 10, wherein the one or more content objects comprise one of a web page, video file, image file, audio file, source code or executable code.

15. The system of claim 10, wherein the browser determines, responsive to the set of instructions of the web page and based on the information loaded by the script, to execute a first portion of the set of instructions to obtain the one or more content objects of the webpage from a location of the client machine instead of executing a second portion of the set of instructions to obtain the one or more content objects of the web page from the remote location.

16. The system of claim 11, wherein the information loaded by the script comprises a set of variables storing the information about the one or more content objects stored on the client machine.

17. The method of claim 10, wherein the script generated by the agent comprises one or more of the following: an object name, an amount of the object in a cache, an object type, an object length, an object status, location information and provider data for at least one of the one or more content objects from the location of the client machine.

18. The system of claim 10, wherein the remote location comprises one of a server, a server appliance, a client appliance or a peer client machine.

* * * * *